(12) United States Patent
Mochizuki et al.

(10) Patent No.: US 9,777,146 B2
(45) Date of Patent: Oct. 3, 2017

(54) THERMOPLASTIC RESIN COMPOSITION AND MOLDED ARTICLE

(71) Applicant: TECHNO POLYMER CO., LTD., Tokyo (JP)

(72) Inventors: Isamu Mochizuki, Tokyo (JP); Kazuya Egawa, Tokyo (JP)

(73) Assignee: TECHNO POLYMER CO., LTD., Tokyo (JP)

(*) Notice: Subject to any disclaimer, the term of this patent is extended or adjusted under 35 U.S.C. 154(b) by 0 days.

(21) Appl. No.: 14/786,903

(22) PCT Filed: Apr. 23, 2014

(86) PCT No.: PCT/JP2014/061431
§ 371 (c)(1),
(2) Date: Oct. 23, 2015

(87) PCT Pub. No.: WO2014/175332
PCT Pub. Date: Oct. 30, 2014

(65) Prior Publication Data
US 2016/0102200 A1    Apr. 14, 2016

(30) Foreign Application Priority Data

Apr. 26, 2013  (JP) ................................. 2013-093334

(51) Int. Cl.
| | | |
|---|---|---|
| C08L 51/06 | (2006.01) | |
| C08L 51/04 | (2006.01) | |
| C08L 25/12 | (2006.01) | |
| C08L 67/02 | (2006.01) | |
| C08L 77/02 | (2006.01) | |
| C08F 255/04 | (2006.01) | |
| C08F 255/06 | (2006.01) | |
| C08F 279/04 | (2006.01) | |

(52) U.S. Cl.
CPC ............ *C08L 51/06* (2013.01); *C08F 255/04* (2013.01); *C08F 255/06* (2013.01); *C08F 279/04* (2013.01); *C08L 25/12* (2013.01); *C08L 51/04* (2013.01); *C08L 67/02* (2013.01); *C08L 77/02* (2013.01)

(58) Field of Classification Search
CPC .......... C08L 25/12; C08L 51/04; C08L 51/06; C08L 77/02; C08L 67/02
See application file for complete search history.

(56) References Cited

U.S. PATENT DOCUMENTS

| | | | |
|---|---|---|---|
| 5,891,943 A | 4/1999 | Katsumata et al. | |
| 9,309,390 B2 | 4/2016 | Mochizuki et al. | |
| 2002/0037965 A1 | 3/2002 | Kinoshita et al. | |
| 2007/0165367 A1* | 7/2007 | Chung | A45C 15/00 |
| | | | 361/825 |

FOREIGN PATENT DOCUMENTS

| | | |
|---|---|---|
| EP | 2610307 A1 | 7/2013 |
| JP | H06-128471 A | 5/1994 |
| JP | H08-259771 A | 10/1996 |
| JP | H08-259772 A | 10/1996 |
| JP | 2004-123823 A | 4/2004 |
| JP | 2005-307180 A | 11/2005 |
| JP | 2005307180 | 11/2005 |
| JP | 2005307180 A * | 11/2005 |
| JP | 2008-516062 A | 5/2008 |
| JP | 2009-179675 A | 8/2009 |
| WO | 2012026415 A1 | 3/2012 |

OTHER PUBLICATIONS

Huo, P.P., et al.; Macromolecules, 1993, p. 3127-3130.*
Aldrich; Reference: Polymer Properties, p. 52-53, [accessed online: https://www.sigmaaldrich.com/content/dam/sigma-aldrich/docs/Aldrich/General_Information/thermal_transitions_of_homopolymers.pdf]; retrieved Aug. 31, 2016.*
PCT/JP2014/061431 Corresponding International Search Report dated Jul. 8, 2014.
Supplementary European Search Report, for corresponding EP 14 78 8917.4, dated Oct. 4, 2016.

* cited by examiner

*Primary Examiner* — Robert Jones, Jr.
(74) *Attorney, Agent, or Firm* — Lando & Anastasi, LLP

(57) ABSTRACT

Provided is a thermoplastic resin composition in which filler such as glass fiber is incorporated to enhance rigidity, and which is further improved in hand touch feeling and occurrence of squeaking noise. The thermoplastic resin composition comprises a rubber-reinforced aromatic vinyl resin (A, B), a crystalline thermoplastic resin (C), and a fibrous or layered filler (D), wherein the thermoplastic resin composition has melting points, as measured according to JIS K7121-1987, between 0 and 100° C. and between 170 and 280° C., and a bending elastic modulus of 3,000 MPa or higher. The component (A) preferably comprises an ethylene/α-olefin rubbery polymer (a1) having a melting point of 0 to 100° C. as measured according to JIS K7121-1987. The component (C) preferably has a melting point of 170 to 280° C. as measured according to JIS K7121-1987, and is preferably at least one selected from the group consisting of a polyester resin and a polyamide resin.

14 Claims, 6 Drawing Sheets

(A)　　　　　　　　　　　　　(B)

(C)

THERMOPLASTIC RESIN COMPOSITION AND MOLDED ARTICLE

CROSS-REFERENCE TO RELATED APPLICATIONS

This application is a U.S. national stage application and claims the benefit under 35 U.S.C. §371 of PCT/JP2014/061431, titled THERMOPLASTIC RESIN COMPOSITION AND MOLDED ARTICLE, filed Apr. 23, 2014, which claims priority to Japanese Patent Application No. 2013-093334, filed Apr. 26, 2013, titled THERMOPLASTIC RESIN COMPOSITION AND MOLDED ARTICLE, which patent applications are hereby incorporated herein by reference in their entireties for all purposes.

TECHNICAL FIELD

The present invention relates to a thermoplastic resin composition in which a fibrous or layered filler such as glass fiber is incorporated to enhance rigidity, and which provides a molded article not only being excellent in rigidity but also generating less squeaking noise as well as being good in hand touch feeling, particularly to a thermoplastic resin composition suitable as a molding material for door knobs, handles, grips, portable articles and the like.

BACKGROUND ART

Thermoplastic resin compositions improved in rigidity by blending rubber-reinforced aromatic vinyl resins represented by ABS resins and AES resins with fillers such as glass fiber are broadly used as molding materials for molded articles requiring mechanical strengths such as impact resistance and rigidity, for electric/electronic devices, office automation devices, household appliances, vehicle components, sanitary supplies and the like.

However, when molded articles to be directly touched by hand, such as assist grips of automobiles, are molded from thermoplastic resin compositions comprising fillers as described above, the following problems occur, though molded articles excellent in rigidity can be obtained: the surface of the molded articles feels rough when the molded articles are touched by hand; and squeaking noise (rubbing noise) is often generated when a pair of the molded articles, or the molded article and another molded article composed of another resin such as polyethylene, polyester and polyvinyl chloride, are used so as to be contacted with and rubbed against each other. The squeaking noise is known as an abnormal sound caused by the stick-slip phenomenon generated when two objects are rubbed against each other, and is a property different from slidability of resins.

The stick-slip phenomenon is understood as a phenomenon in which frictional force largely varies periodically as illustrated in FIG. 13; and more specifically, it is generated as illustrated in FIG. 14. That is, in the case where an object M connected to a spring is placed on a driving board moving at a driving velocity V as shown in the model of FIG. 14(a), the object M first moves to the right direction together with the board moving at the driving velocity V by the action of a static frictional force as illustrated in FIG. 14(b). Then, when the force of the spring exerted so as to restore the object M becomes equal to the static frictional force, the object M starts to slip in the direction opposite to the driving velocity V. At this time, since the object M receives a dynamic frictional force, the slipping stops at the time point of FIG. 14(c) when the force of the spring becomes equal to the dynamic frictional force, that is, the object M sticks to the driving board, and results in again moving in the same direction as the driving velocity V (FIG. 14(d)). This is called the stick-slip phenomenon; and it is said that, as illustrated in FIG. 13, if the difference $\Delta\mu$ between a static friction coefficient $\mu s$ and a friction coefficient $\mu l$ which is the lower end of the sawtooth wave is large, the squeaking noise becomes liable to occur. Here, the dynamic friction coefficient is a value midway between the $\mu s$ and the $\mu l$. Therefore, even when the absolute value of the static friction coefficient is low, the squeaking noise becomes liable to occur, if the $\Delta\mu$ is large. Such squeaking noise becomes a main cause for impairing comfortableness and quietness in automobile cabins, offices and house rooms, and reduction of squeaking noise is strongly demanded.

Although a thermoplastic resin composition comprising a rubber-reinforced aromatic vinyl resin blended with a crystalline resin, polybutylene terephthalate (PBT) is conventionally known, it just aims at improvement of coatability (Patent Document 1 and Patent Document 2); no disclosure is made about the system in which fillers such as glass fiber are incorporated; or no disclosure or suggestion is made about the improvement of hand touch feeling or the squeaking noise of the resin composition comprising glass fiber.

CONVENTIONAL TECHNICAL REFERENCES

Patent Documents

Patent Document 1: Japanese Patent Laid-Open (Kokai) No. H07-3095
Patent Document 2: Japanese Patent Laid-Open (Kokai) No. 2001-234040

SUMMARY OF INVENTION

Problems to be Solved by Invention

Under the above circumstances, an object of the present invention is to solve the problems of the hand touch feeling and the squeaking noise generated in the case of incorporating filler such as glass fiber in a rubber-reinforced aromatic vinyl resin composition.

Means for Solving the Problems

As a result of diligent studies to solve the above-mentioned problems, the present inventors have found that the hand touch feeling of molded articles is improved, and the occurrence of squeaking noise is remarkably reduced, when fibrous or layered filler (D) such as glass fiber is blended with a polymer alloy in which a rubber-reinforced aromatic vinyl resin (A, B) comprising a rubber-reinforced aromatic vinyl graft resin (A) and an aromatic vinyl copolymer resin (B) is blended with a crystalline thermoplastic resin (C) so that the polymer alloy exhibits melting points in two different specific temperature ranges; and thereby leading to the completion of the present invention.

Thus, according to one aspect of the present invention, there is provided a thermoplastic resin composition comprising a rubber-reinforced aromatic vinyl resin (A, B), a crystalline thermoplastic resin (C) and fibrous or layered filler (D), said thermoplastic resin composition having melting points, as measured according to JIS K7121-1987, between 0 and 100° C. and between 170 and 280° C. as well as a bending elastic modulus of 3,000 MPa or higher.

According to another aspect of the present invention, there is provided a molded article, comprising the above thermoplastic resin composition according to the present invention, such as a door knob, a handle, a grip or a portable article.

According to a still another aspect of the present invention, there is provided an article comprising at least two components contacting with each other, wherein at least one of the components is the above molded article according to the present invention.

Effect of Invention

According to the present invention, a rubber-reinforced aromatic vinyl resin (A, B) comprising a rubber-reinforced aromatic vinyl graft resin (A) and an aromatic vinyl copolymer resin (B) is mixed with a crystalline thermoplastic resin (C) to form a polymer alloy exhibiting melting points in two different specific temperature ranges, and the polymer alloy is blended with a fibrous or layered filler (D) in an amount sufficient to exhibit a bending elastic modulus of 3,000 MPa or higher. Thus, there is provided a molded article excellent in rigidity, improved in hand touch feeling, and reduced in squeaking noise remarkably.

DESCRIPTION OF EMBODIMENTS

Figure 1:
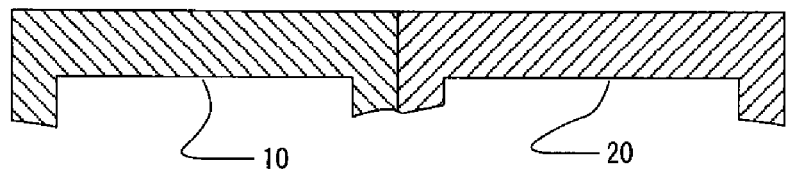
FIG. 1 is a cross-sectional view illustrating one mode of a contact portion of an article according to the present invention.

Hereinafter, the present invention will be described in detail. In the present invention, "(co)polymer" means homopolymer and/or copolymer; "(meth)acryl" means acryl and/or methacryl; and "(meth)acrylate" means acrylate and/or methacrylate.

1. The Thermoplastic Resin Composition According to the Present Invention

The thermoplastic resin composition according to the present invention is a thermoplastic resin composition comprising a rubber-reinforced aromatic vinyl resin (A, B), a crystalline thermoplastic resin (C) and a fibrous or layered filler (D), and having melting points between 0 and 100° C. and between 170 and 280° C. as measured according to JIS K7121-1987, and thus is characterized by having melting points in the two respective temperature ranges of 0 to 100° C. and 170 to 280° C. Such a thermoplastic resin composition having two different melting points can be obtained, for example, by polymer-alloying a first resin component exhibiting a melting point in the temperature range of 0 to 100° C. (hereinafter, also referred to as "first melting point"), and a second resin component exhibiting a melting point in the temperature range of 170 to 280° C. (hereinafter, also referred to as "second melting point"). The composition according to the present invention may have another melting point originated from another component than the first and second resin components unless the effect of the invention is impaired.

The thermoplastic resin composition according to the present invention at least comprises, as resin components, the following three components: a rubber-reinforced aromatic vinyl graft resin (A) and an aromatic vinyl copolymer resin (B) constituting the rubber-reinforced aromatic vinyl resin (A, B), and a crystalline thermoplastic resin (C). Among the three components, the aromatic vinyl copolymer resin (B) is noncrystalline, and thus does not give any melting point to the thermoplastic resin composition according to the present invention. Among the three components, the rubber-reinforced aromatic vinyl graft resin (A) usually has no melting point within the temperature range of 170 to 280° C. but has a melting point within the temperature range of 0 to 100° C., in view of its constituents. Therefore, the melting point of the thermoplastic resin composition according to the present invention exhibited in the temperature range of 0 to 100° C. is usually originated from the rubber-reinforced aromatic vinyl graft resin (A), and the melting point exhibited in the temperature range of 170 to 280° C. is usually originated from the crystalline thermoplastic resin (C). In other words, the component (A) corresponds to the first resin component exhibiting the first melting point, and the component (C) corresponds to the second resin component exhibiting the second melting point.

In the present invention, the melting point (Tm) means one measured according to JIS K7121-1987, and is specifically a value read from a peak temperature in an endothermic pattern acquired by measurement of endothermic change at a constant temperature-rise rate of 20° C. per 1 min by using DSC (differential scanning calorimeter). In the DSC measurement, the case exhibiting no clear peak in the endothermic change means having substantially no crystallinity, and thus is judged to exhibit no melting point (Tm) according to the present invention, and is defined as falling outside the thermoplastic resin composition according to the present invention.

2. A Rubber-Reinforced Aromatic Vinyl Graft Resin (A) (Hereinafter Also Referred to as "Component (A)"), and an Aromatic Vinyl Copolymer Resin (B) (Hereinafter Also Referred to as "Component (B)")

An example of a rubber-reinforced aromatic vinyl graft resin (A) constituting the rubber-reinforced aromatic vinyl resin (A, B) in the thermoplastic resin composition according to the present invention includes a graft copolymer which comprises a rubbery polymer onto which a (co)polymer containing a structural unit originated from an aromatic vinyl compound and optionally a structural unit originated from a compound copolymerizable with the aromatic vinyl compound are grafted.

Although the component (A), as described above, can function as a component giving a melting point exhibited in the temperature range of 0 to 100° C. to the thermoplastic resin composition according to the present invention, it is needed in order to fulfill the above function that the rubber moiety of the component (A) contains a crystalline rubber component, specifically, a crystalline rubber component having a melting point (Tm) of 0 to 100° C., since the (co)polymer moiety in the component (A), which contains a structural unit originated from the aromatic vinyl compound, is amorphous.

An example of the aromatic vinyl copolymer resin (B) constituting the rubber-reinforced aromatic vinyl resin (A, B) of the thermoplastic resin composition according to the present invention includes a (co)polymer containing a structural unit originated from an aromatic vinyl compound and optionally a structural unit originated from a compound copolymerizable with the aromatic vinyl compound. In contrast to the component (A), the component (B) is a (co)polymer not grafted to the rubbery polymer, that is, a non-grafted copolymer.

As the rubbery polymer (a) constituting the rubber moiety of the component (A), there can be used a rubbery polymer comprising a crystalline rubbery polymer having a melting point (Tm) of 0 to 100° C. The rubbery polymer (a) may be a crosslinked polymer, or a non-crosslinked polymer. These can be used singly or in a combination of two or more.

The crystalline rubbery polymer typically includes an ethylene/α-olefin rubbery polymer (a1) having a melting point (Tm) of 0 to 100° C., and includes, for example, an ethylene/α-olefin copolymer. Here, the melting point (Tm) means one measured according to JIS K7121-1987 as in the above. In the DSC measurement, the case exhibiting no clear peak in the endothermic change means having substantially no crystallinity in the rubbery polymer, and thus is judged to exhibit no Tm, and is defined as falling outside the above rubbery polymer having the Tm of 0 to 100° C.

The melting point (Tm) of the rubbery polymer (a), that is, the first melting point according to the present invention is preferably 0 to 90° C., more preferably 10 to 80° C., and especially preferably 20 to 80° C. In the case where the melting point (Tm) is lower than 0° C. or higher than 100° C., the effect of reducing squeaking noise of molded articles is inferior.

The fact that the rubbery polymer (a) has a melting point (Tm) means that the rubbery polymer (a) has a crystalline moiety. It is presumed that when a crystalline moiety is present in the rubbery polymer (a), the occurrence of the slip-stick phenomenon is suppressed as described above to thereby suppress the occurrence of squeaking noise of molded articles.

The glass transition temperature (Tg) of the rubbery polymer (a) is preferably −20° C. or lower, more preferably −30° C. or lower, and especially preferably −40° C. or lower. The glass transition temperature can be determined according to JIS K7121-1987 by using DSC (differential scanning calorimeter) as in the measurement of the Tm (melting point).

Examples of the α-olefin constituting the above component (a1) include α-olefins having 3 to 20 carbon atoms, and specifically include propylene, 1-butene, 1-pentene, 1-hexene, 4-methyl-1-pentene, 1-heptene, 1-octene, 1-decene, 1-dodecene, 1-hexadecene and 1-eicosene. These α-olefins can be used singly or as a mixture of two or more. The number of carbon atoms of the α-olefin is preferably 3 to 20, more preferably 3 to 12, and still more preferably 3 to 8. The mass ratio of ethylene: α-olefin is usually 5 to 95:95 to 5, preferably 50 to 95:50 to 5, and more preferably 60 to 95:40 to 5. When the mass ratio of ethylene: α-olefin is in the above range, impact resistance of the obtained molded articles becomes better and thus preferable.

The ethylene/α-olefin rubbery polymer (a1) may contain a nonconjugated diene, that is, may be an ethylene/α-olefin/nonconjugated diene copolymer as long as having a melting point (Tm) of 0 to 100° C. The nonconjugated diene includes alkenylnorbornenes, cyclic dienes and aliphatic dienes, and is preferably 5-ethylidene-2-norbornene and dicyclopentadiene. These nonconjugated dienes can be used singly or as a mixture of two or more. Proportion of the nonconjugated diene to the total amount of the rubbery polymer is usually 0 to 10% by mass, preferably 0 to 5% by mass, and more preferably 0 to 3% by mass.

Mooney viscosity (ML(1+4)100° C., according to JIS K6300) of the component (a1) is usually 5 to 80, preferably 10 to 65, and more preferably 10 to 45. When the Mooney viscosity is within the above range, moldability and impact resistance of the obtained molded articles are better, and thus preferable.

From the viewpoint of reducing squeaking noise, the ethylene/α-olefin rubbery polymer (a1) is preferably ethylene/α-olefin copolymers comprising no nonconjugated diene component; among these, more preferable are an ethylene/propylene copolymer, an ethylene/1-butene copolymer and an ethylene/1-octene copolymer; and especially preferable is an ethylene/propylene copolymer.

From the viewpoint of the effect of reducing squeaking noise, the rubber moiety of the component (A) is preferably constituted wholly by the ethylene/α-olefin rubbery polymer (a1), but may comprise, in addition to the ethylene/α-olefin rubbery polymer (a1), a dienic rubbery polymer (a2) (hereinafter, also referred to as "component (a2)") as long as not impairing the effect of reducing squeaking noise.

The dienic rubbery polymer (a2) includes homopolymers such as polybutadiene and polyisoprene; butadiene-based copolymers such as styrene/butadiene copolymers, styrene/butadiene/styrene copolymers, acrylonitrile/styrene/butadiene copolymers and acrylonitrile/butadiene copolymers; and isoprene-based copolymers such as styrene/isoprene copolymers, styrene/isoprene/styrene copolymers and acrylonitrile/styrene/isoprene copolymers. These may be random copolymers or may be block copolymers. These can be used singly or in a combination of two or more. The dienic rubbery polymer (a2) may be a crosslinked polymer or an uncrosslinked polymer.

In the present invention, the content of the rubbery polymer (a) is preferably 2 to 30% by mass, more preferably 1 to 20% by mass, still more preferably 1 to 12% by mass, and further still more preferably 1 to 8% by mass, with respect to 100% by mass of the total amount of the component (A), the component (B) and the component (C). When the content of the rubbery polymer (a) is within the above range, molded articles composed of the resin composition according to the present invention are more improved in mechanical strength, reduction of squeaking noise, and hand touch feeling.

Specific examples of the aromatic vinyl compound constituting structural units of the component (A) and the component (B) include styrene, α-methylstyrene, o-methylstyrene, p-methylstyrene, β-methylstyrene, ethylstyrene, p-tert-butylstyrene, vinyltoluene, vinylxylene and vinylnaphthalene. These compounds can be used singly or in a combination of two or more. Among these, styrene and α-methylstyrene are preferable, and styrene is especially preferable.

The compound polymerizable with the aromatic vinyl compound can constitute a structural unit of the component (A) and the component (B). As such a copolymerizable compound, preferably, at least one selected from vinyl cyanide compounds and (meth)acrylic ester compounds; and as required, further another vinyl monomer copolymerizable with these compounds can also be used. Such another vinyl monomer includes maleimide compounds, unsaturated acid anhydrides, carboxyl group-containing unsaturated compounds, hydroxyl group-containing unsaturated compounds, oxazoline group-containing unsaturated compounds and epoxy group-containing unsaturated compounds; and these can be used singly or in a combination of two or more.

Specific examples of the vinyl cyanide compounds include acrylonitrile, methacrylonitrile, ethacrylonitrile, α-ethylacrylonitrile and α-isopropylacrylonitrile. These compounds can be used singly or in a combination of two or more. Among these, acrylonitrile is preferable.

Specific examples of the (meth)acrylic ester compounds include methyl (meth)acrylate, ethyl (meth)acrylate, n-propyl(meth)acrylate, isopropyl(meth)acrylate, n-butyl (meth)acrylate, isobutyl(meth)acrylate, sec-butyl (meth)acrylate, tert-butyl (meth)acrylate, hexyl(meth)acrylate, n-octyl (meth)acrylate, 2-ethylhexyl(meth)acrylate, cyclohexyl (meth)acrylate, phenyl(meth)acrylate and benzyl (meth) acrylate. These compounds can be used singly or in a combination of two or more. Among these, methyl methacrylate is preferable.

Specific examples of the maleimide compounds include N-phenylmaleimide and N-cyclohexylmaleimide. These compounds can be used singly or in a combination of two or more.

Specific examples of the unsaturated acid anhydrides include maleic anhydride, itaconic anhydride and citraconic anhydride. These compounds can be used singly or in a combination of two or more.

Specific examples of the carboxyl group-containing unsaturated compounds include (meth)acrylic acid, ethacrylic acid, maleic acid, fumaric acid, itaconic acid, crotonic acid and cinnamic acid. These compounds can be used singly or in a combination of two or more.

Specific examples of the hydroxyl group-containing unsaturated compounds include 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl (meth)acrylate, 2-hydroxypropyl (meth)acrylate and 3-hydroxypropyl(meth)acrylate. These compounds can be used singly or in a combination of two or more.

In the case where the total amount of the structural units originated from the aromatic vinyl compound and the structural units originated from the compound copolymerizable with the aromatic vinyl compound is taken to be 100% by mass, the lower limit value of the content of the structural units originated from the aromatic vinyl compound in the component (A) or the component (B) is preferably 40% by mass, more preferably 50% by mass, and still more preferably 60% by mass. Here, the upper limit value is usually 100% by mass.

In the case where the component (A) or the component (B) comprises structural units originated from the aromatic vinyl compound and the vinyl cyanide compound, the content of the structural units originated from the aromatic vinyl compound is usually 40 to 90% by mass, and preferably 55 to 85% by mass, in the case where the total amount of both structural units is taken to be 100% by mass; and the content of the structural units originated from the vinyl cyanide compound is 10 to 60% by mass, and preferably 15 to 45% by mass, in the case where the total amount of both structural units is taken to be 100% by mass.

The component (A) can be produced, for example, by graft-polymerizing a vinyl monomer (b) composed of an aromatic vinyl compound and optionally another vinyl compound copolymerizable with the aromatic vinyl compound in the presence of a rubbery polymer (a) comprising a crystalline rubber component having a melting point (Tm) of 0 to 100° C. Polymerization method in this production method is not especially limited as long as being capable of providing the component (A) which is a graft copolymer, and a known method can be adopted. The polymerization method can be one using emulsion polymerization, suspension polymerization, solution polymerization, bulk polymerization or a combination thereof. In these polymerization methods, a known polymerization initiator, chain transfer agent (molecular weight regulator), emulsifier and the like can suitably be used.

In the above production method, there can usually be provided a mixed product of the above component (A) being a graft copolymer formed by graft-polymerizing a (co) polymer of the vinyl monomer (b) to the rubbery polymer (a) and the above component (B) being a (co)polymer of the vinyl monomer (b) which are not graft-polymerized to the rubbery polymer (a). As the case may be, the mixed product may comprise the rubbery polymer (a) having no (co) polymer graft-polymerized thereto. Since the thermoplastic resin composition according to the present invention comprises the rubber-reinforced aromatic vinyl resin (A, B) as an essential component, in other words, comprises both of the component (A) and the component (B) as essential components, the mixed product of the component (A) and the component (B) produced as described above can be used as it is as the rubber-reinforced aromatic vinyl resin (A, B), as a raw material for the thermoplastic resin composition according to the present invention.

The component (A) can be separated from the mixed product of the component (A) and the component (B) by solvent separation using acetone. Specifically, by adding the mixed product of the component (A) and the component (B) to acetone and shaking, and thereafter subjecting the mixture to centrifugal separation, the component (A) is obtained as an acetone-insoluble matter and the component (B) is obtained as an acetone-soluble matter. Therefore, the acetone-insoluble matter separated from the mixed product of the component (A) and the component (B) by acetone separation may be used as the component (A) which is a raw material for the thermoplastic resin composition according to the present invention. Similarly, the acetone-soluble matter separated from the mixed product of the component (A) and the component (B) by acetone separation may be used as the component (B) which is a raw material for the thermoplastic resin composition according to the present invention. The rubber-reinforced aromatic vinyl resin (A, B) may be a mixture produced by mixing the component (A) and the component (B) separated as described above.

The component (B) in the thermoplastic resin composition according to the present invention may be produced by polymerizing the vinyl monomer (b) composed of the aromatic vinyl compound and optionally another vinyl compound copolymerizable with the aromatic vinyl compound, in the absence of the rubbery polymer (a). Therefore, the component (B) produced in the above method may be used as the component (B) which is a raw material for the thermoplastic resin composition according to the present invention. Similarly, the rubber-reinforced aromatic vinyl resin (A, B) may comprise the component (B) produced by the polymerization in the absence of the rubbery polymer (a), as shown in the above method.

As described above, the rubber-reinforced aromatic vinyl resin (A, B) of the thermoplastic resin composition according to the present invention may comprise, in addition to the crystalline rubbery polymer such as an ethylene/α-olefin rubbery polymer (a1), a dienic rubbery polymer (a2) as the rubbery polymer (a) constituting the rubber moiety of the component (A). Production methods of such a rubber-reinforced aromatic vinyl resin (A, B) comprising a plurality of rubbery polymers include, for example, a method of graft-polymerizing the vinyl monomer (b) in the presence of a rubbery polymer (a) comprising the rubbery polymer (a1) and the rubbery polymer (a2), and besides, a method of mixing a rubber-reinforced aromatic vinyl resin produced by graft-polymerizing the vinyl monomer (b) in the presence of a rubbery polymer (a) comprising the rubbery polymer (a1) with a rubber-reinforced aromatic vinyl resin produced by graft-polymerizing the vinyl monomer (b) in the presence of a rubbery polymer (a) comprising the rubbery polymer (a2). The blend proportion of the rubbery polymer (a2) with respect to 100% by mass of the rubbery polymer (a) is preferably 20 to 80% by mass, more preferably 25 to 75% by mass, and especially preferably 30 to 70% by mass. In this range, impact resistance of the thermoplastic resin composition according to the present invention becomes more sufficient, and thus preferable.

Graft ratio of the component (A) is usually 10 to 150%, preferably 15 to 120%, more preferably 20 to 100%, and especially preferably 30 to 80%. When the graft ratio of the component (A) is within the above range, impact resistance and moldability of the resin composition become better.

The graft ratio can be determined by the following equation (1).

$$\text{Graft ratio (\% by mass)} = ((S-T)/T) \times 100 \quad (1)$$

In the above equation, S is a mass (g) of an insoluble matter obtained by adding 1 g of the component (A) or 1 g of a mixture of the components (A) and (B) obtained by the above production method of graft polymerization, in 20 ml of acetone, shaking the resultant for 2 hours by a shaker under the temperature condition of 25° C., and thereafter centrifugally separating the resultant for 60 min under the temperature condition of 5° C. into the insoluble matter and a soluble matter by a centrifugal separator (rotation speed: 23,000 rpm); and T is a mass (g) of the rubbery polymer (a) contained in 1 g of the component (A). The mass of the rubbery polymer (a) can be acquired by a method of a calculation from a polymerization prescription and a polymerization conversion, or a method of determining from an infrared absorption spectrum (IR), pyrolytic gas chromatography, CHN element analysis, or the like.

The graft ratio can be regulated, for example, by suitably selecting kind and amount of a chain transfer agent, kind and amount of a polymerization initiator, addition method and addition time of monomers during polymerization, polymerization temperature and others employed in graft polymerization for producing the component (A).

Limiting viscosity (in methyl ethyl ketone, 30° C.) of the component (B) of the thermoplastic resin composition according to the present invention is usually 0.1 to 1.5 dl/g, preferably 0.15 to 1.2 dl/g, and more preferably 0.15 to 1.0 dl/g. When the limiting viscosity is within the above range, impact resistance and moldability of the resin composition become better.

Measurement of the limiting viscosity [η] is carried out by the following method. First, the acetone soluble matter of the component (B) or the mixture of the component (A) and the component (B) is dissolved in methyl ethyl ketone to make five solutions having different concentrations. From the results of reduced viscosities at 30° C. of the solutions of the respective concentrations using an Ubbelohde viscometer, a limiting viscosity [η] is determined. The unit is dl/g.

The limiting viscosity [η] can be regulated, for example, by suitably selecting kind and amount of a chain transfer agent, kind and amount of a polymerization initiator, addition method and addition time of monomers during polymerization, polymerization temperature, polymerization time and others employed in graft polymerization of the component (A) or polymerization of the component (B). The limiting viscosity can also be regulated by suitably selecting and mixing two or more components (B) having different limiting viscosities [η].

In the case where the total amount of the rubber-reinforced aromatic vinyl resin (A, B) and the component (C) is taken to be 100% by mass, in other words, the total amount of the component (A), the component (B) and the component (C) is taken to be 100% by mass, the content of the component (A) in the thermoplastic resin composition according to the present invention is usually 1 to 40% by mass, preferably 1 to 30% by mass, and more preferably 1 to 25% by mass. In the case where the total amount of the rubber-reinforced aromatic vinyl resin (A, B) and the component (C) is taken to be 100% by mass, in other words, the total amount of the component (A), the component (B) and the component (C) is taken to be 100% by mass, the content of the component (B) in the thermoplastic resin composition according to the present invention is usually 1 to 79% by mass, preferably 5 to 75% by mass, and more preferably 10 to 70% by mass. When the contents of the component (A) and the component (B) are within the above ranges, the abnormal sound risk index is more reduced; the effect of improving squeaking noise is more enhanced; and the effect of improving hand touch feeling is more enhanced.

2. A Crystalline Thermoplastic Resin (C) (Hereinafter Also Referred to as "Component (C)")

As described above, the crystalline thermoplastic resin (C) constituting the resin component of the thermoplastic resin composition according to the present invention can function as a component that gives a melting point (Tm) exhibited in the temperature range of 170 to 280° C. to the thermoplastic resin composition according to the present invention. Here, the above component (A) is excluded from the component (C).

The crystalline thermoplastic resin (C) is not especially limited as long as having a melting point (Tm) of 170 to 280° C., but is preferably at least one selected from the group consisting of polyester resins and polyamide resins. Here, the melting point (Tm) means one measured according to JIS K7121-1987 as in the above. In the DSC measurement, a resin exhibiting no clear peak in the endothermic change has substantially no crystallinity, and thus is judged to have no Tm, and is defined as falling outside the component (C) having a melting point (Tm) of 170 to 280° C.

The melting point (Tm) of the component (C), that is, the second melting point according to the present invention is preferably 190 to 260° C., more preferably 200 to 250° C., and especially preferably 210 to 240° C. In the cases where the melting point (Tm) is lower than 170° C. or higher than 280° C., the effect of reducing squeaking noise of molded articles is inferior.

The polyester resins include, for example, ones produced by polycondensing a dicarboxylic acid, an ester thereof or an ester-forming derivative thereof with a diol component by a known method; and these can be used singly or in a combination of two or more.

Examples of the dicarboxylic acid include terephthalic acid, isophthalic acid, adipic acid, sebacic acid and naphthalene-2,6-dicarboxylic acid; and the ester-forming derivatives thereof can be used as a component of the aromatic polyester resin according to the present invention. Further p-hydroxybenzoic acid can be used singly or concurrently with the diol component and the dicarboxylic acid.

Examples of the diol component include polymethylene glycols having 2 to 6 carbon atoms (for example, ethylene glycol, 1,4-butanediol and 1,6-heanediol), 1,4-cyclohexanediol, bisphenol A, hydroquinone and ester-forming derivatives thereof; and the above-mentioned dicarboxylic components, the above-mentioned diol components and the like can be each used singly or in a combination of two or more.

The polyester resin to be used in the present invention is preferably an aromatic polyester resin, more preferably a polybutylene terephthalate, a polyethylene terephthalate or a polyethylene naphthalate, and especially preferably a polyethylene terephthalate. These can be used singly or in a combination of two or more.

The limiting viscosity of the aromatic polyester resin to be used in the present invention is not especially limited; but in the case of a polyester terephthalate, the limiting viscosity [η] (unit: dl/g) measured at 25° C. in a mixed solvent of tetrachloroethane/phenol in equal parts is preferably 0.5 to 2.0, and more preferably 0.5 to 1.5.

In the case of a polybutylene terephthalate, one having a limiting viscosity [η] (unit: dl/g) measured at 25° C. in o-chlorophenol as a solvent in the range of 0.4 to 2.0 is preferably used.

The polyamide resins include polyamides derived from a diamine component and a dicarboxylic acid component, polyamides derived from ring-opening polymerization of a lactam, polyamides derived from an aminocarboxylic acid, copolymerized amides thereof, and further mixed polyamides thereof.

The diamine component includes aliphatic, alicyclic or aromatic diamines such as ethylenediamine, tetramethylenediamine, hexamethylenediamine, 2,3,4- or 4,4,4-trimethylenehexamethylenediamine, 1,3- or 1,4-bis(aminomethyl)cyclohexane, bis(p-aminohexyl)methane, phenyldiamine, m-xylenediamine and p-xylenediamine.

The dicarboxylic acid component includes aliphatic, alicyclic or aromatic dicarboxylic acids such as adipic acid, suberic acid, sebacic acid, cyclohexanedicarboxylic acid, terephthalic acid and isophthalic acid.

The lactams include caprolactam and lauryl lactam. The aminocarboxylic acids include ω-aminocaproic acid, ω-aminoundecanoic acid and 1,2-aminododecanoic acid.

These diamines, dicarboxylic acids, lactams and aminocarboxylic acids can be used by suitably combining these.

Preferable polyamide resins include nylon 6 (polycaproamide), nylon 6,6 (polyhexamethylene adipamide), nylon 12 (polydodecamide), nylon 6,10 (polyhexamethylene sebacamide), nylon 4,6 (polytetramethylene adipamide), and copolymers or mixtures thereof. Especially preferable polyamide resins include nylon 6, nylon 6,6 and nylon 12.

Degree of polymerization of the polyamide resin is not especially limited as long as it exhibits a melting point (Tm) in the range of 170 to 280° C., but is, in terms of relative viscosity, usually 1.6 to 6.0, and preferably 2.0 to 5.0. The relative viscosity is a value obtained by dissolving 2 g of a polymer in 100 ml of formic acid (purity: 90% by mass), and measuring a viscosity at 30° C.

In the case where the total amount of the rubber-reinforced aromatic vinyl resin (A, B) and the component (C) is taken to be 100% by mass, in other words, the total amount of the component (A), the component (B) and the component (C) is taken to be 100% by mass, the content of the component (C) in the thermoplastic resin composition according to the present invention is usually preferably 10 to 80% by mass, preferably 10 to 70% by mass, more preferably 10 to 60% by mass, and especially preferably 15 to 50% by mass. When the content of the component (C) is within the above range, the abnormal sound risk index is more reduced; the effect of reducing squeaking noise is more enhanced; and the hand touch feeling becomes better, and thus preferable.

3. Fibrous or Layered Filler (D) (Hereinafter Also Referred to as "Component (D)")

The filler (D) to be used in the present invention is not especially limited as long as being a fibrous or layered one. The fibrous filler includes inorganic fibers such as glass fibers and ceramic whiskers, and additionally organic fibers such as carbon fibers and aramid fibers. Examples of the layered filler include scaly and platy fillers, and specifically include montmorillonite, hectorite, vermiculite, saponite and glass flakes.

The filler (D) to be used in the present invention is, from the viewpoint of rigidity, hand touch feeling, moldability and heat resistance, preferably fibrous, and more preferably glass fibers. The glass fibers are not especially limited, and may be either of a long fiber type (roving) and a short fiber type (chopped strand), or may be a combination thereof. Further the cross-sectional shape of the glass fibers is not especially limited. Raw material glasses for the glass fibers include silicate glass, borosilicate glass and phosphate glass; and the kinds of glasses include E glass, C glass, A glass, S glass, M glass, AR glass and L glass. The glass fibers may be ones surface-treated with sizing agents containing a known synthetic resin emulsion, water-soluble synthetic resin, coupling agent (amine-, silane-, epoxy-based or the like), film-forming agent, lubricant, surfactant, antistatic agent and the like.

In the case where the filler to be used in the present invention is glass fiber, the average length of the glass fiber is preferably 1 to 10 mm, and more preferably 2 to 6 mm; and the average diameter is preferably 5 to 25 μm, and more preferably 8 to 20 μm. Further the aspect ratio (average length/average diameter) of the glass fiber is preferably 10 or higher, more preferably 25 or higher, and especially preferably 50 or higher; and the upper limit of the aspect ratio is usually 1,000 or lower. When the average length, the average diameter and the aspect ratio of the glass fiber are within the above ranges, the moldability of the thermoplastic resin composition according to the present invention, and the rigidity and the hand touch feeling of obtained molded articles become more sufficient and thus preferable.

The residual average fiber length of the glass fiber contained in molded articles obtained from the thermoplastic resin composition according to the present invention is preferably 150 to 1,000 µm, more preferably 200 to 800 µm, and still more preferably 250 to 700 µm. Similarly, the aspect ratio (residual average fiber length/average diameter) of the glass fiber contained in the molded article is preferably 10 to 1,000, more preferably 25 to 800, and still more preferably 50 to 500. When the residual average fiber length and aspect ratio are within the above ranges, rigidity and hand touch feeling of obtained molded articles become more sufficient and thus preferable. The residual average fiber length can be measured, for example, by cutting out a part of the molded article, heating it at 800° C. to decompose the resin components, and image-analyzing the fiber length of the remaining glass fiber.

In the case where the filler to be used in the present invention is a layered one, the major diameter of the layered filler contained in molded articles obtained from the thermoplastic resin composition according to the present invention is preferably 10 to 1,500 µm, more preferably 25 to 1,000 µm, and still more preferably 50 to 800 µm. Further the thickness of the layered filler is preferably 1 to 200 µm, more preferably 1 to 100 µm, and still more preferably 1 to 50 µm. The aspect ratio (major diameter/thickness) of the layered filler is usually 10 to 1,000, preferably 25 to 800, and especially preferably 50 to 500. When the major diameter and the aspect ratio are within the above ranges, rigidity and hand touch feeling of the obtained molded articles become more sufficient. The major diameter can be measured, for example, by cutting out a part of the molded article, heating it at 800° C. to decompose the resin components, and image-analyzing the remaining layered filler.

The content of the component (D) in the thermoplastic resin composition according to the present invention is not especially limited as long as being an amount enough to impart a sufficient rigidity to a polymer alloy composed of the component (A), the component (B) and the component (C), that is, to impart a bending elastic modulus of 3,000 MPa or higher. In the case where the total amount of the rubber-reinforced aromatic vinyl resin (A, B) and the component (C) is taken to be 100 parts by mass, the content of the component (D) is preferably 5 to 50 parts by mass, more preferably 8 to 35 parts by mass, and especially preferably 10 to 25 parts by mass. When the content of the component (D) is within the above range, rigidity of molded articles becomes more sufficient, and thus preferable.

4. A Production Method of the Thermoplastic Resin Composition

The thermoplastic resin composition according to the present invention can be obtained by mixing the component (A), the component (B), the component (C), the component (D) and optionally other components, in desired blend ratios, and melt-kneading the mixture. As described above, in the case where the component (A) is produced by graft polymerization, a mixture of the component (A) and the component (B) is obtained, since the component (B) is produced as a by-product. The mixture of the component (A) and the component (B) can be used as it is as a raw material. Further the component (B) produced separately from the component (A) may be additionally mixed to the mixture. Here, the component (B) produced as a by-product in the production of the component (A) may be the same as or different from the component (B) produced separately from the production of the component (A) in copolymer composition or physical properties such as limiting viscosity.

The other components capable of being incorporated in the thermoplastic resin composition according to the present invention include a nucleating agent, a lubricant, a thermal stabilizer, an antioxidant, an ultraviolet absorbent, an anti-aging agent, a plasticizer, an antibacterial agent, a colorant, and filler other than the component (D). These components can be incorporated as long as not being contrary to the object of the present invention.

The thermoplastic resin composition according to the present invention can further comprise, as required, another thermoplastic resin than the components (A), (B) and (C) as long as not being contrary to the object of the present invention. Examples of such another thermoplastic resin include polyvinyl chloride, polymethyl methacrylate resins, polycarbonate (PC) resins, polylactic acid resins, polystyrene resins, high impact polystyrene resins, and ASA resins. These can be used singly or in a combination of two or more.

The thermoplastic resin composition according to the present invention can be produced by mixing the respective components in a predetermined blend ratio by a tumbler mixer, a Henschel mixer or the like, and thereafter melt-kneading the mixture using a kneading machine such as a single-screw extruder, a twin-screw extruder, a Banbury mixer, a kneader, a roll and a feeder ruder under proper conditions. A preferable kneading machine is a twin-screw extruder. Further when the respective components are kneaded together, the respective components may be kneaded as a whole, or partly in more than one stage. After the respective components are kneaded by a Banbury mixer, a kneader or the like, they may be pelletized by an extruder. Further, fillers that are fibrous are preferably fed to the midway of the extruder by a side feeder in order to prevent the cutting during the kneading. The melt-kneading temperature is usually 200 to 300° C., and preferably 220 to 280° C.

The thermoplastic resin composition according to the present invention has preferably an abnormal sound risk index of 5 or lower, and more preferably 3 or lower, the abnormal sound risk index being measured in a test conducted in accordance with the method later-described in Examples using a stick-slip tester SSP-02 manufactured by ZINS Ziegler-Instruments GmbH, under the conditions of a temperature of 23° C., a humidity of 50% RH, a load of 100 N and a velocity of 10 mm/sec. According to the standard (VDA203-260) of Verband der Automobilindustrie e.V., an abnormal sound risk index of 3 or lower is satisfactory. Such a preferable abnormal sound risk index can be fulfilled by suitably regulating the contents of the components (A) to (D) according to the present application.

5. Molded Articles

The molded article formed of the thermoplastic resin composition according to the present invention can be suppressed in occurrence of squeaking noise from the article, when being used as at least one component of an article comprising at least two components contacting with each other. Therefore, according to the present invention, an article comprising at least two components contacting with each other, at least one of the components being a molded article composed of the thermoplastic resin composition according to the present invention, is provided, in which it is preferable that the two or more components are molded articles composed of the thermoplastic resin composition according to the present invention, and it is especially preferable that all the components are molded articles composed of the thermoplastic resin composition according to the present invention.

The method for producing the molded article or component from the thermoplastic resin composition according to the present invention is not particularly limited, and includes known methods, for example, injection molding, injection compression molding, gas-assisted molding, press molding, blow molding and profile extrusion, and additionally, film and sheet molding represented by calender molding and T-die extrusion.

The thermoplastic resin composition according to the present invention is suitable as a molding material for an article in which at least two components among components of the article always or intermittently contact with each other, and mutually slightly move or collide at contact portions of the two components when an external force such as vibration, torsion and impact is exerted on the article. The contact mode of such contact portions may be any of surface contact, line contact, point contact and the like, and may be partial adhesion. Such an article specifically includes an article in which one surface of a component 10 and one surface of a component 20 contact with each other in the mutually butted state as illustrated in FIG. 1, and articles in which a part of a component 10 contacts with a recess formed on a component 20 in the engaged state as illustrated in FIGS. 2 to 6.

Figure 2:
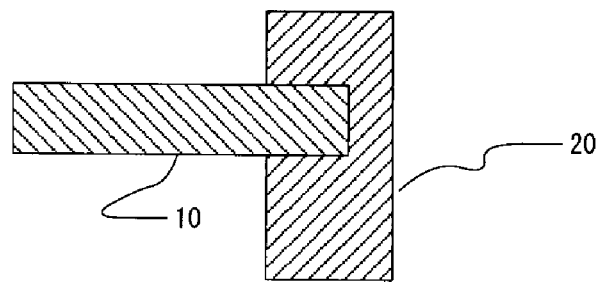
FIG. 2 is a cross-sectional view illustrating another mode of a contact portion of an article according to the present invention.
Figure 3:
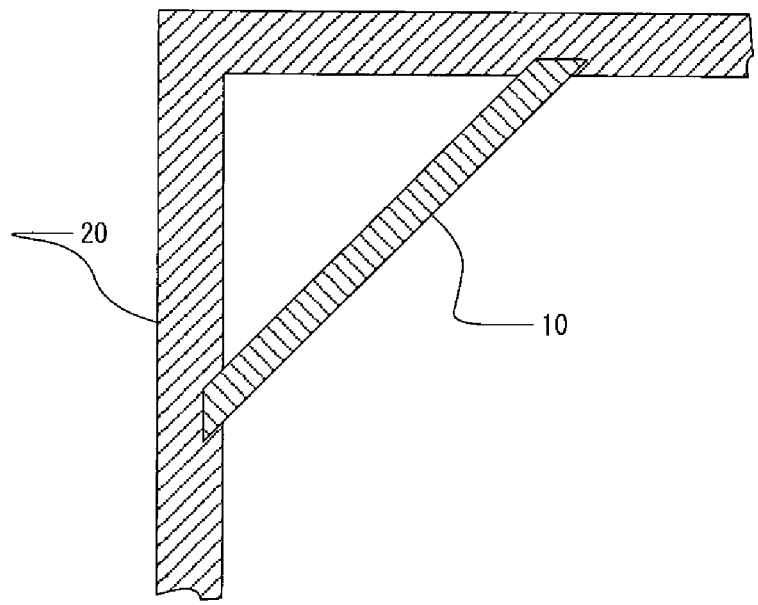
FIG. 3 is a cross-sectional view illustrating another mode of a contact portion of an article according to the present invention.
Figure 4:
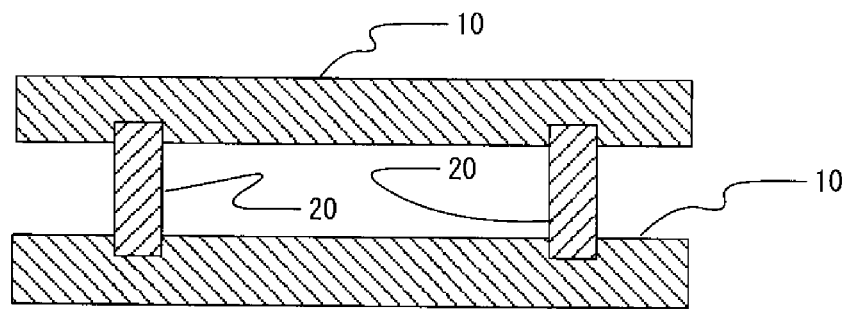
FIG. 4 is a cross-sectional view illustrating another mode of a contact portion of an article according to the present invention.
Figure 5:
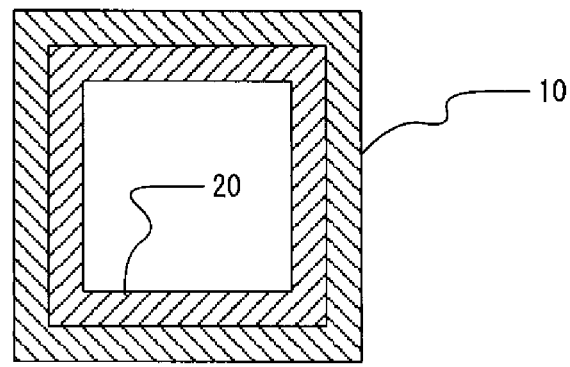
FIG. 5 is a cross-sectional view illustrating another mode of a contact portion of an article according to the present invention.

Specific examples of articles in which components contact with each other in the engaged state include an article in which one end of a component 10 contacts with a complementary recess formed on a component 20 in a tightly engaged state, as illustrated in FIG. 2; an article in which the respective ends of a component 10 contact with two complementary recesses formed on a corner of a component 20 in a tightly engaged state, as illustrated in FIG. 3; an article in which the respective ends of components 20 contact with complementary recesses formed on two components 10 arranged nearly parallelly in a tightly engaged state, as illustrated in FIG. 4; and an article in which a component 20 having an outside surface whose size is the same as that of an inside surface of a component 10 is nested in the component 10 so that the interior surface and the outside surface of the two contact with each other in a tightly engaged state, as illustrated in FIG. 5.

Figure 6:
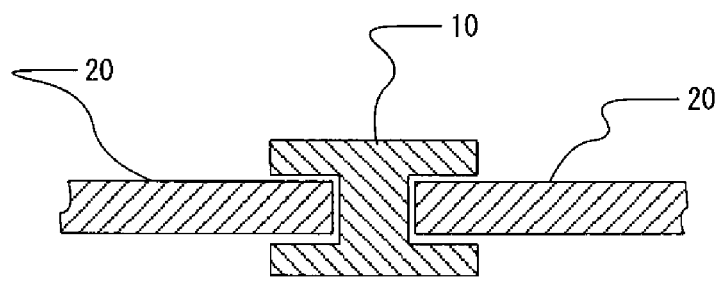
FIG. 6 is a cross-sectional view illustrating another mode of a contact portion of an article according to the present invention.

Further, two components of an article according to the present invention do not need to be tightly engaged with each other; and as illustrated in FIG. 6, the article may be one in which the two components are engaged with each other with some degree of gap and play, and repeat mutual contact and non-contact when an external force such as vibration, torsion and impact is exerted on the article.

Figure 7:
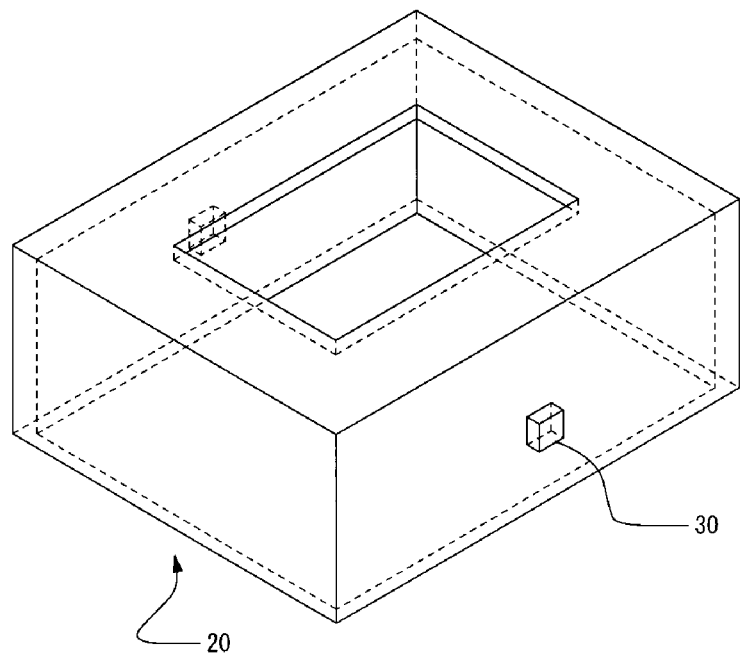
FIG. 7 is a schematic perspective view illustrating a component 20 of an article of FIG. 8.
Figure 8:
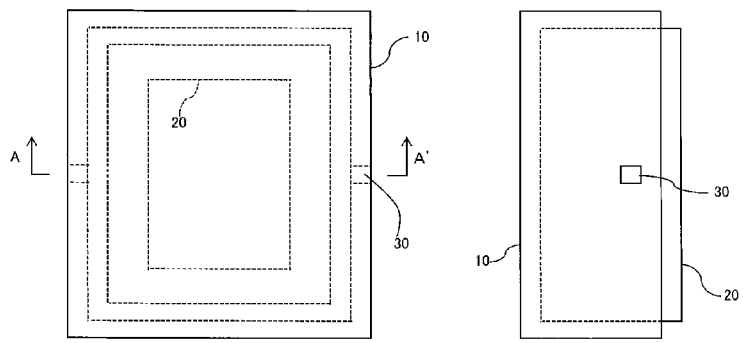
FIG. 8(A) is a top view illustrating one example of an article according to the present invention composed of components 10 and 20 engaged with each other.
FIG. 8(B) is a right-side view of FIG. 8(A)
FIG. 8(C) is a cross-sectional view taken along line A-A' of FIG. 8(A).
Figure 8:
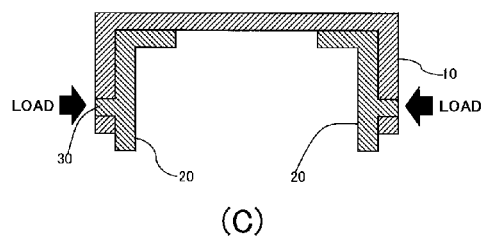

An article combinedly having contact portions as described above includes one as illustrated in FIG. 8. In the article of FIG. 8, a component 10 is a box-shaped component composed of a rectangular parallelepiped whose bottom surface is wholly opened, and a component 20 is a molded article having the similar shape as the component 10 and having a rectangular opening on the central portion of the top surface. Then, as illustrated in FIG. 8, the component 20 can be engaged inside the component 10. The outer peripheral surface of the component 20 and the inner peripheral surface of the component 10 contact with each other, and the two are slightly deformed and repeat contact and non-contact when being given an external force such as vibration. As well shown in FIG. 7, the component 20 has protrusions 30 on the opposing outside surfaces; and as illustrated in FIG. 8, the component 10 has holes to accommodate the protrusions 30 on two opposing side surfaces thereof. Then, when the component 10 is engaged with the component 20, the protrusions 30 are made snap-fit with the holes so that the two components are not easily disengaged. By molding at least one of the component 10 and the component 20 from the thermoplastic resin composition according to the present invention, occurrence of squeaking noise can be prevented, for example, even when external forces are applied in the arrow directions in FIG. 8(C). Here, the directions of external forces are not limited to those of FIG. 8(C); and in the case where at least one of the component 10 and the component 20 is molded of the thermoplastic resin composition according to the present invention, occurrence of squeaking noise is prevented, even when external forces are applied in other directions. Here, the cross-sectional shape of the protrusions 30 and the shape of the holes of the component 10 may be altered in FIG. 8 such that the two components may be altered to press-fit with each other.

Figure 9:
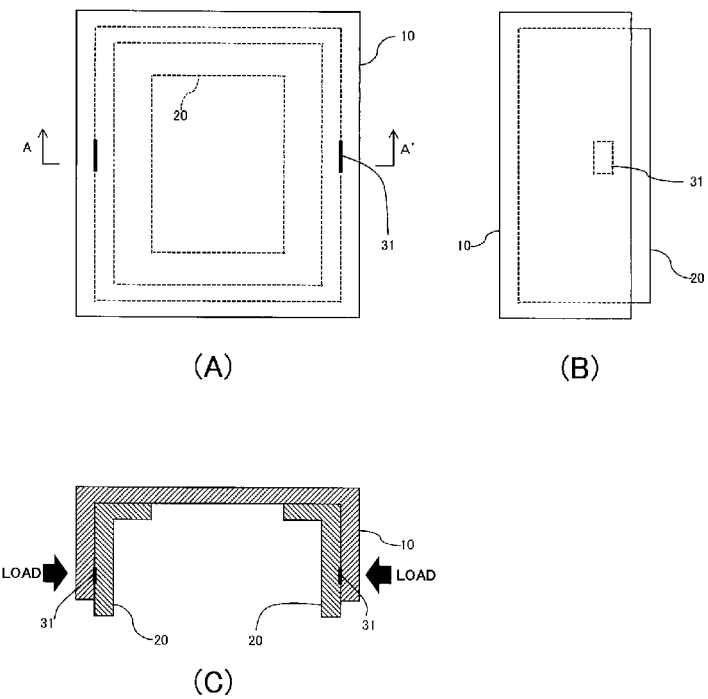
FIG. 9 is a view similar to FIG. 8, illustrating one modified example of the article according to the present invention illustrated in FIG. 8.

FIG. 9 illustrates the same mode of an article as that of FIG. 8, except that the inside and outside surfaces of the respective components 10 and 20 are partly bonded with an adhesive agent 31 instead of using the protrusions 30 and the holes to be snap-fit therewith of the respective components 10 and 20. Further in place of the adhesive agent 31, the component 10 and the component 20 can be mutually welded by laser welding or the like; and this method is favorable in the case where the two components are thermoplastic resin molded articles. Particularly when laser welding is employed, it is preferable that components are combined, one being formed of a transparent thermoplastic resin which transmits laser light, and the other being formed of a thermoplastic resin which absorbs the laser light; and specific products include, for example, measuring instruments such as vehicular speedometers, and illuminating lamps.

Figure 10:
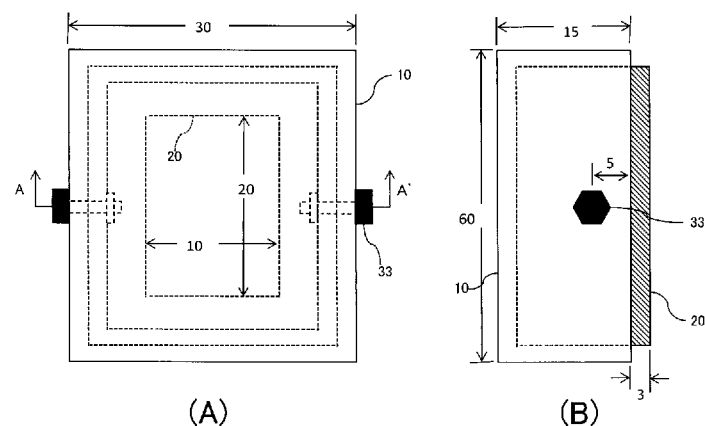
FIG. 10 is a view similar to FIG. 8, illustrating another modified example of the article according to the present invention illustrated in FIG. 8; and unit of dimension indicated in the figure is mm.
Figure 10:
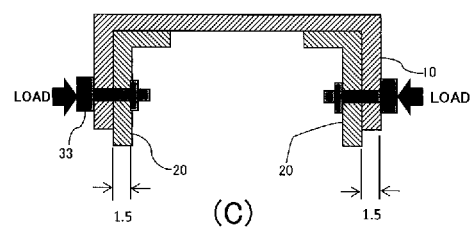

An example shown in FIG. 10 illustrates the same mode of an article as that of FIG. 8, except that holes are opened at opposing positions of opposing side surfaces of the components 10 and 20, and that the two components are configured so as to be fastened and fixed with bolts and nuts through the two holes. The component 10 and the component 20 may be fixed using screws, pins, machine screws, rivets, bushes, brackets, hinges, nails or the like, in place of bolts and nuts.

Figure 11:
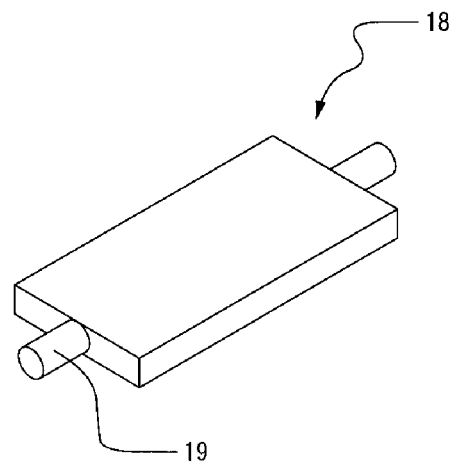
FIG. 11 is a schematic perspective view illustrating a component 18 of an article according to the present invention illustrated in FIG. 12.
Figure 12:
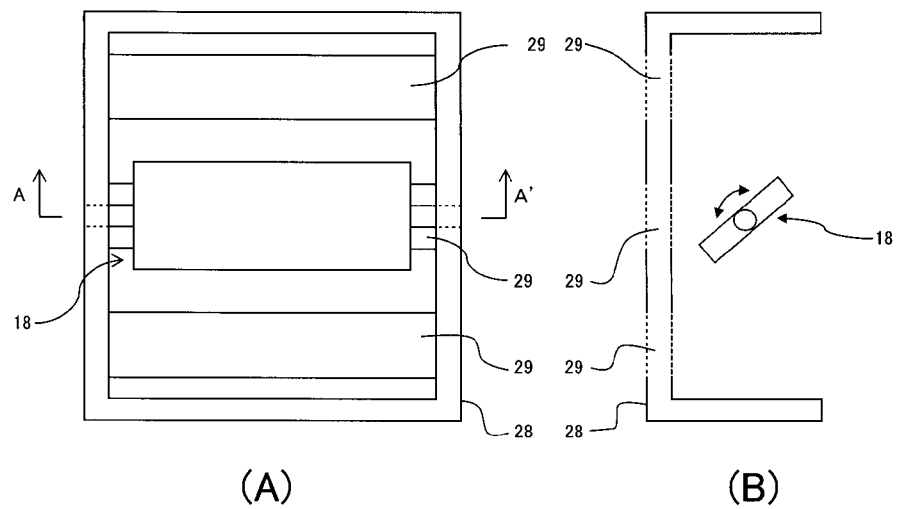
FIG. 12(A) is a top view illustrating one example of the article according to the present invention composed of the component 18 and a frame-shaped component 28 supporting the component 18 rotatably about a shaft 19.
FIG. 12(B) is a right-side view of FIG. 12(A)
FIG. 12(C) is a cross-sectional view taken along line A-A' of FIG. 12(A).
Figure 12:
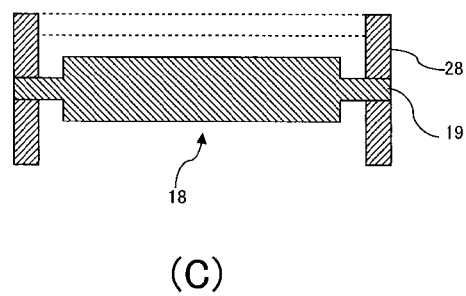
Figure 13:
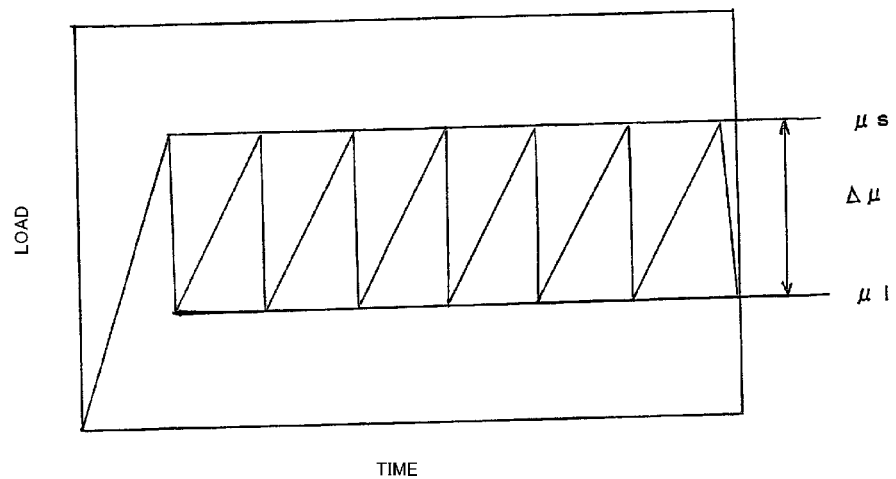
FIG. 13 is an explanatory diagram of the stick-slip phenomenon.
Figure 14:
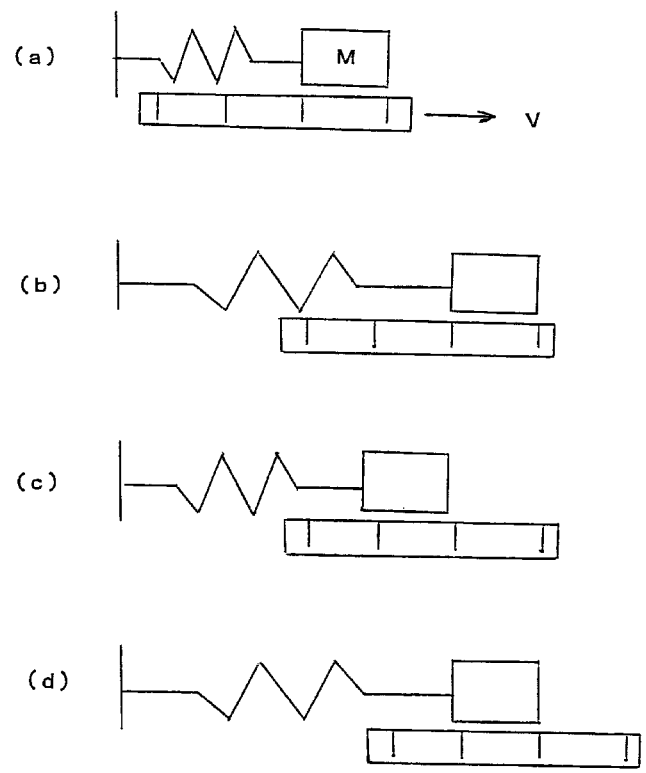
FIGS. 14(a), (b), (c) and (d) are model diagrams of the stick-slip phenomenon.

Further, an article as illustrated in FIG. 12 is suitable to be molded of the thermoplastic resin composition according to the present invention, the article having a component 18 as illustrated in FIG. 11 in which cylindrical shafts 19 protrude from both ends of a rectangular plate-shaped body in the longitudinal direction, and a frame-shaped component 28 for rotatably supporting the component 18 about the shafts 19 with the shafts 19 of the component 18 being inserted therein. By molding at least one of the components 18 and 28 from the thermoplastic resin composition according to the present invention, occurrence of squeaking noise can be suppressed in case the component 18 is rotated about the shafts 19, or in case an external force such as vibration is exerted on the article.

When the frame-shaped component 28 has a plurality of openings 29 as illustrated in FIG. 12, the article can suitably be used as an apparatus for regulating a flow amount or direction of air depending upon an angle of the component 18. Such an apparatus includes diffusers of household and vehicular air conditioners, air cleaners, air blowers and the like.

When at least one of the components 10, 18 and the components 20, 28 in the above articles is the above-described molded article formed of the thermoplastic resin composition according to the present invention, occurrence of squeaking noise can be remarkably reduced; however, the other component may also be the above-described molded article formed of the thermoplastic resin composition according to the present invention.

In the articles according to the present invention, materials constituting components other than the components made of molded articles formed of the thermoplastic resin composition according to the present invention are not especially limited, and examples thereof include thermoplastic resins excluding the thermoplastic resin composition according to the present invention, as well as thermosetting resins, rubbers, organic materials, inorganic materials and metallic materials.

Examples of the thermoplastic resins constituting components formed of materials other than the thermoplastic resin composition according to the present invention include polyvinyl chloride, polyethylene, polypropylene, AS resins, ABS resins, AES resins, ASA resins, polymethyl methacrylate resins, polystyrene resins, high-impact polystyrene resins, ethylene-vinyl acetate (EVA) resins, polyamide (PA) resins, polyethylene terephthalate resins, polybutylene terephthalate resins, polycarbonate (PC) resins, polylactic resins, PC/ABS resins, PC/AES resins, PA/ABS resins, and PA/AES resins. These can be used singly or in a combination of two or more.

Examples of the thermosetting resins constituting components formed of materials other than the thermoplastic resin composition according to the present invention include phenol resins, epoxy resins, urea resins, melamine resins, and unsaturated polyester resins. These can be used singly or in a combination of two or more.

Examples of the rubbers constituting components formed of materials other than the thermoplastic resin composition according to the present invention include chloroprene rubbers, polybutadiene rubbers, ethylene/propylene rubbers, various types of synthetic rubbers such as SEBS, SBS and SIS, and natural rubbers. These can be used singly or in a combination of two or more.

Examples of the organic materials constituting components formed of materials other than the thermoplastic resin composition according to the present invention include insulation boards, MDF (medium density fiberboards), hard boards, particle boards, lumber cores, LVL (laminated veneer lumbers), OSB (oriented strand boards), PSL (parallel strand lumbers), WB (wafer boards), hard fiberboards, soft fiberboards, lumber core plywoods, board core plywoods, special core plywoods, veneer core veneer boards, laminated paper sheets or boards impregnated with a tap resin, boards obtained by mixing fine pieces or strips of crushed (waste) papers or the like with an adhesive agent followed by thermal compression, and various types of woods. These can be used singly or in a combination of two or more.

Examples of the inorganic materials constituting components formed of materials other than the thermoplastic resin composition according to the present invention include calcium silicate boards, flexible boards, homo cement boards, gypsum boards, sheathing gypsum boards, reinforced gypsum boards, gypsum lath boards, decorative gypsum boards, composite gypsum boards, various types of ceramics, and glasses. These can be used singly or in a combination of two or more.

Examples of the metallic materials constituting components formed of materials other than the thermoplastic resin composition according to the present invention include iron, aluminum, copper, and various types of alloys. These can be used singly or in a combination of two or more.

Among these, preferable are thermoplastic resins, thermosetting resins and rubbers, and especially preferable are ABS resins, AES resins, PC resins, ABS resins, PC/AES resins and polymethyl methacrylate resins.

The article according to the present invention, in which at least one of the components thereof is molded of the thermoplastic resin composition according to the present invention, can suitably be used as parts of automobiles, parts of business machines, parts of houses, parts of household appliances, and the like, since occurrence of squeaking noise is suppressed even if the components repeat contact and non-contact by vibration, sliding and the like.

When a part of automobiles is constituted by the molded article of the thermoplastic resin composition according to the present invention, occurrence of squeaking noise can be reduced remarkably, even if the part repeats contact and non-contact with another part, for example, by vibration during vehicle running. Further, when the thermoplastic resin composition according to the present invention comprises a dienic rubber, it is excellent in fracture characteristics at low temperature, and thus especially suitable for vehicular interior parts. Such vehicular parts include door trims, door linings, pillar garnishes, consoles, door pockets, ventilators, ducts, plate-like vanes of air conditioners, valve shutters, louvers, meter visors, instrument panel upper garnishes, instrument panel lower garnishes, A/T indicators, on/off-switches (slide parts, slide plates), grill front defrosters, grill side defrosters, lid clusters, cover instrumental lowers, masks (mask switches, mask radios, and the like), glove boxes, pockets (pocket decks, pocket cards, and the like), steering wheel phone pads, parts of switches, and exterior parts of car navigation. Among these, the thermoplastic resin composition can especially suitably be used as ventilators, plate-like vanes of air conditioners, valve shutters, louvers, parts of switches, exterior parts of car navigation, and the like.

When a part of business machines is constituted by the molded article of the thermoplastic resin composition according to the present invention, occurrence of squeaking noise can be reduced remarkably, even if the part repeats contact and non-contact with another part, for example, by vibration during operation, and opening/closing of desk drawers.

When a part of houses is constituted by the molded article of the thermoplastic resin composition according to the present invention, occurrence of squeaking noise can be reduced remarkably, even if the part repeats contact and non-contact with another part, for example, by opening/closing of doors and sliding doors.

When a part of household appliances is constituted by the molded article of the thermoplastic resin composition according to the present invention, occurrence of squeaking noise can be reduced remarkably, even if the part repeats contact and non-contact with another part, for example, by vibration during operation. Such a part for household appliances includes exterior parts such as cases and housings, interior parts, switch-related parts, and parts for movable units.

The molded articles according to the present invention are especially suitable as parts of electric or electronic devices, optical devices, illuminating devices, business machines or household appliances, interior parts for automobiles, interior parts for houses and others, since not only occurrence of squeaking noise is reduced but also hand touch feeling is good with high rigidity. Among these, the articles are especially suitable as parts for vehicles such as automobiles, which are often touched by hand, for example, grips such as assist grips, and besides, parts such as handles and door knobs, as well as portable articles. From the viewpoint of safety, operation feeling, deformation and the like, bending elastic modulus of the molded articles is 3000 MPa or higher, and preferably 3200 MPa or higher.

The parts of electric or electronic devices and optical devices include housings and covers of cameras such as digital video cameras and still cameras, which are often touched by hand, and besides, housings, covers and the like of hand-held computers, cell phones, personal digital assistants and the like.

The parts of illuminating devices include panels, covers, connectors and switch-related parts of ceiling light.

The parts of business machines include exterior parts such as cases and housings, interior parts, switch-related parts, parts for movable units, desk lock parts, desk drawers, and paper trays for copying machines.

The parts of household appliances include exterior parts such as cases and housings, interior parts, switch-related parts, and parts for movable units.

Examples of the interior parts of automobiles include door knobs, handles and grips such as assist grips, additionally door trims, door linings, pillar garnishes, consoles, console boxes, center panels, door pockets, ventilators, ducts, air conditioners, meter visors, instrument panel upper garnishes, instrument panel lower garnishes, A/T indicators, on/off-switches (slide parts, slide plates), switch bezels, grill front defrosters, grill side defrosters, lid clusters, cover instrumental lowers, masks (mask switches, mask radios, and the like), glove boxes, pockets (pocket decks, pocket cards, and the like), steering wheel phone pads, parts of switches, and exterior parts of car navigation.

The interior parts of houses include door knobs, shelf doors, chair dampers, movable components for table folding legs, door open/close dampers, sliding door rails and curtain rails.

EXAMPLES

Hereinafter, the present invention will be described more specifically by way of Examples, but the present invention is not limited to the following Examples. In Examples, parts and % are in terms of mass unless otherwise specified.
(1) Evaluation Methods
(1-1) Bending Elastic Modulus A thermoplastic resin composition was injection-molded by an injection molding machine "IS-170FA" (trade name) manufactured by Toshiba Machine Co., Ltd. at a cylinder temperature of 250° C., an injection pressure of 80 MPa and a metal mold temperature of 60° C., and thereby five molded articles were obtained which had a length of 80 mm, a width of 10 mm and a thickness of 4 mm. Bending elastic moduli of the obtained molded articles were measured according to ISO 178 using a device "Autograph AG5000" manufactured by Shimadzu Corp. at a span of 64 mm and a crosshead speed of 2 mm/min in accordance with the secant method; and a bending elastic modulus was calculated as an average value of the five measurement values.

(1-2) Evaluation of Hand Touch Feeling

A thermoplastic resin composition was injection-molded by an injection molding machine "IS-170FA" (trade name) manufactured by Toshiba Machine Co., Ltd. at a cylinder temperature of 250° C., an injection pressure of 80 MPa and a metal mold temperature of 60° C. to thereby obtain plate-like molded articles having a length of 150 mm, a width of 75 mm and a thickness of 4 mm. Five panelists checked the feeling when touching by hand the surface of the obtained plate-like molded article, and judged hand touch feeling according to the following criteria.
<Evaluation Criteria>
+++: The five panelists all judged that the article felt smooth.
++: One to four panelists out of the five judged that the article felt rough.
+: The five panelists all judged that the article felt rough.
(1-3) Evaluation of Squeaking Noise (Abnormal Sound Risk Index)

A thermoplastic resin composition was injection-molded by an injection molding machine "IS-170FA" (trade name) manufactured by Toshiba Machine Co., Ltd. at a cylinder temperature of 250° C., an injection pressure of 50 MPa and a metal mold temperature of 60° C. to thereby obtain a molded article having a length of 150 mm, a width of 100 mm and a thickness of 4 mm, from which a test piece having a length of 60 mm, a width of 100 mm and a thickness of 4 mm and a test piece having a length of 50 mm, a width of 25 mm and a thickness of 4 mm were then cut out by a disk saw. Then, the ends of the test pieces were chamfered by #100 sandpaper; and thereafter, fine burrs were removed by a cutter knife to thereby obtain two large and small sheets of the test pieces for squeaking noise evaluation.

The test pieces for evaluation were left in an oven bath regulated at 80° C.±5° C. for 300 hours, and thereafter cooled at 25° C. for 24 hours to thereby obtain thermally aged test pieces for evaluation. The resulting test pieces for evaluation, namely, two large and small sheets of molded articles were set on a stick-slip tester SSP-02 manufactured by ZINS Ziegler-Instruments GmbH, and the abnormal sound risk index was measured when the test pieces were three times rubbed against each other with a swing of 20 mm at a temperature of 23° C., a humidity of 50% RH, a load of 5 N to 40 N and a velocity of 1 mm/sec to 10 mm/sec. Also, an abnormal sound risk index was measured by the same method as the above except that no thermal aging was carried out. The larger the abnormal sound risk index is, the more easily squeaking noise occurs. Here, since the test pieces were thermally aged and then evaluated, the test method was made it possible to evaluate sustainability of the effect of reducing squeaking noise. Here, evaluation criteria of the results of Table 1 are as follows.
<Evaluation Criteria>
+++: The highest abnormal sound risk index under the testing condition was 1 to 3.
++: The highest abnormal sound risk index under the testing condition was 4 to 5.
+: The highest abnormal sound risk index under the testing condition was 6 to 10.
(2) Raw Materials Used
(2-1) A Rubber-Reinforced Aromatic Vinyl Resin (a Mixed Product of a Component (A) and a Component (B))

A 20 L-volume stainless steel autoclave equipped with a ribbon stirrer blade, an auxiliary agent-continuous adding device, a thermometer and the like was charged with 22 parts of an ethylene/propylene copolymer (ethylene/propylene=78/22(%), Moony viscosity (ML(1+4)100° C.): 20, melting point (Tm): 40° C., glass transition temperature (Tg): −50° C.) as an ethylene/α-olefin rubbery polymer (a1), 55 parts of styrene, 23 parts of acrylonitrile, 0.5 part of t-dodecylmercaptane and 110 parts of toluene; the internal temperature was raised to 75° C.; and the content in the autoclave was stirred for 1 hour, thereby making a homogeneous solution. Thereafter, 0.45 part of t-butylperoxyisopropyl monocarbonate was added; the internal temperature was further raised to 100° C.; after the temperature reached 100° C., polymerization reaction was carried out at a stirring rotation speed of 100 rpm while the above temperature was maintained. Four hours after the initiation of the polymerization reaction, the internal temperature was raised to 120° C.; while the temperature was maintained, the reaction was further carried out for 2 hours before the polymerization reaction was terminated. Polymerization conversion was 98%. Thereafter, the internal temperature was cooled to 100° C.; 0.2 part of octadecyl-3-(3,5-di-t-butyl-4-hydroxyphenol)-propionate and 0.02 part of a dimethylsilicone oil, KF-96-100 cSt (trade name, manufactured by Shin-Etsu Silicone Co., Ltd.) were added; thereafter, the reaction mixture was extracted from the autoclave; unreacted substances and the solvent were distilled away by steam distillation; and further volatile components were substantially degassed by using an extruder (cylinder temperature: 220° C., degree of vacuum: 760 mmHg) with a 40 mmϕ-vent to pelletize the resultant. In the obtained ethylene/α-olefin rubber-reinforced aromatic vinyl resin (a mixture of a component (A1) and a component (B)), the content of the ethylene/α-olefin rubbery polymer (a1) was 22% (which was calculated from the polymerization conversion); the graft ratio was 70%; the limiting viscosity [η] of an acetone-soluble matter was 0.47 dl/g; and the melting point as measured according to JIS K7121-1987 was 40° C.

(2-2) A Rubber-Reinforced Aromatic Vinyl Resin (a Mixed Product of a Component (A') and a Component (B))

A 20 L-volume stainless steel autoclave equipped with a ribbon stirrer blade, an auxiliary agent-continuous adding device, a thermometer and the like was charged with 30 parts of an ethylene/α-olefin rubber (an ethylene/propylene/dicyclopentadiene copolymer of ethylene/propylene/dicyclopentadiene=63/32/5(%) and a Mooney viscosity ($ML_{1+4}$ 100° C.) of 33), 45 parts of styrene, 25 parts of acrylonitrile, t-dodecylmercaptane and 140 parts of toluene; the internal temperature was raised to 75° C.; and the content in the autoclave was stirred for 1 hour, thereby making a homogeneous solution. Thereafter, 0.45 part of t-butylperoxyisopropyl monocarbonate was added: the internal temperature was further raised to 100° C.; after the temperature reached 100° C., polymerization reaction was carried out at a stirring rotation speed of 100 rpm while the above temperature was maintained. Four hours after the initiation of the polymerization reaction, the internal temperature was raised to 120° C.; while the temperature was maintained, the reaction was further carried out for 2 hours before the polymerization reaction was terminated. Thereafter, the internal temperature was cooled to 100° C.; 0.2 part of octadecyl-3-(3,5-di-t-butyl-4-hydroxyphenol)-propionate was added; thereafter, the reaction mixture was extracted from the autoclave; unreacted substances and the solvent were distilled away by steam distillation; and further volatile components were substantially degassed by using an extruder (cylinder temperature: 220° C., degree of vacuum: 760 mmHg) with a 40 mmϕ-vent to pelletize the resultant. In the obtained ethylene/α-olefin rubber-reinforced aromatic vinyl resin (a mixture of a component (A1') and a component (B)), the graft ratio was 60%; and the limiting viscosity [η] of an acetone-soluble matter was 0.45 dl/g. There was observed no melting point of the obtained ethylene/α-olefin rubber-reinforced aromatic vinyl resin as measured according to JIS K7121-1987.

(2-3) A Rubber-Reinforced Aromatic Vinyl Resin (a Mixed Product of a Component (A1") and a Component (B))

A 7 L-internal volume glass flask equipped with a stirrer was charged under a nitrogen gas stream with 75 parts of ion-exchange water, 0.5 part of potassium rosinate, 0.1 part of tert-dodecylmercaptane, 39 parts (solid content) of a polybutadiene rubber latex (number-averaged particle diameter: 3,500 Å, gel content: 85%), 15 parts of styrene, and 5 parts of acrylonitrile, and the mixture was heated under stirring. At the time when the internal temperature reached 45° C., a solution in which 0.2 part of sodium pyrophosphate, 0.01 part of ferrous sulfate heptahydrate and 0.2 part of glucose were dissolved in 20 parts of ion-exchange water was added, and further stirred. Thereafter, 0.07 part of cumene hydroperoxide was added to initiate polymerization.

After the polymerization was carried out for 1 hour, further 50 parts of ion-exchange water, 0.7 part of potassium rosinate, 31 parts of styrene, 10 parts of acrylonitrile, 0.05 part of tert-dodecylmercaptane and 0.01 part of cumene hydroperoxide were continuously added over 3 hours.

The polymerization was continued for 1 hour; then, 0.2 part of 2,2'-methylene-bis(4-ethyl-6-tert-butylphenol) was added so as to complete the reaction. Polymerization conversion was 98%. From the latex as the reaction product, the resin components were coagulated with a sulfuric acid solution, washed with water, and thereafter dried to obtain a rubber-reinforced aromatic vinyl resin (a mixed product of a component (A1") and a component (B)).

In the obtained rubber-reinforced aromatic vinyl resin, the content of polybutadiene rubber (PBD) was 40% (measured using pyrolytic gas chromatography); the graft ratio was 68%; the intrinsic viscosity [η] (measured in methyl ethyl ketone at 30° C.) of the acetone-soluble matter was 0.45 dl/g; and there was observed no melting point of the obtained rubber-reinforced aromatic vinyl resin as measured according to JIS K7121-1987.

(2-4) Copolymer (B)

An AS resin "SAN-H" (trade name) manufactured by Techno Polymer Co., Ltd. was used.

(2-5) PBT

A polybutylene terephthalate resin "Duranex 600FP" (trade name) (melting point (Tm): 223° C.) manufactured by Polyplastics Co., Ltd. was used.

(2-6) PA

A polyamide resin "Novamide 1015" (trade name) (melting point (Tm): 225° C.) manufactured by Mitsubishi Engineering-Plastics Corporation was used.

(2-7) PP

A polypropylene resin "Novatec PP BC6C" (trade name) (melting point (Tm): 165° C.) manufactured by Japan Polypropylene Corporation was used.

(2-8) Fillers (2-8-1) Glass Fiber

A glass fiber "MA FT698" (trade name) (fibrous, fiber length: 3 mm, fiber diameter: 13 μm) manufactured by Owens Corning Corp. was used.

(2-8-2) Glass Flake

Microglas Fleka "REFG-101" (trade name) (scaly, average thickness of base glass: 5 μm, average diameter of base glass: 600 μm) manufactured by Nippon Sheet Glass Company, Ltd. was used.

(2-8-3) Glass Bead

A glass bead "GB731" (trade name) (spheroidal, soda-lime glass, average particle diameter: 32 μm) manufactured by Potters-Ballotini Co., Ltd. was used.

(2-9) Antiaging Agents

"DSTP Yoshitomi" (trade name) manufactured by API Corporation was used as a sulfur-based antiaging agent.

"Adeka Stab AO-80" (trade name) manufactured by Adeka Corporation was used as a phenol-based antiaging agent.

Examples 1 to 13 and Comparative Examples 1 to 7

Components described in Table 1 were mixed in blend proportions described therein by a Henschel mixer, and thereafter melt-kneaded and pelletized by a twin-screw extruder (manufactured by Japan Steel Works, Ltd., TEX44α, barrel set temperature: 250° C.) to obtain resin compositions. The obtained resin compositions were evaluated by the above-mentioned evaluation methods. The evaluation results were shown in Table 1.

TABLE 1

|  |  |  | Example | | | | | |
|---|---|---|---|---|---|---|---|---|
|  |  |  | 1 | 2 | 3 | 4 | 5 | 6 |
| Rubber-Reinforced Aromatic Vinyl Resin (A, B) | Component (A) (graft ratio: 70%) | | 7.5 | 7.5 | 3.7 | 7.5 | 7.5 | 7.5 |
| | Component (A') (graft ratio: 60%) | | | | | | | |
| | Component (A") (graft ratio: 68%) | | | | | | | |
| | By-produced Component (B) | | 12.5 | 12.5 | 6.3 | 12.5 | 12.5 | 12.5 |
| | Component (B) (SAN-H (trade name)) | | 40 | 40 | 50 | 40 | 40 | 60 |
| Component (C) | PBT (Tm = 223° C.) | | 40 | | 40 | 40 | 40 | 20 |
| | PA (Tm = 225° C.) | | | 40 | | | | |
| | PP (Tm = 165° C.) (control) | | | | | | | |
| Component (D) | Glass Fiber | | 10 | 10 | 10 | 25 | 20 | 10 |
| | Glass Flake | | | | | | | |
| | Glass Bead (control) | | | | | | | |
| Antiaging Agent | Sulfur-based | | 0.5 | 0.5 | 0.5 | 0.5 | 0.5 | 0.5 |
| | Phenol-based | | 0.2 | 0.2 | 0.2 | 0.2 | 0.2 | 0.2 |
| Another Resin (E) | Polycarbonate | | | | | | | |
| Content of Component (A) (% by weight) | | | 7.5 | 7.5 | 3.7 | 7.5 | 7.5 | 7.5 |
| Total Content of Component (B) (% by weight) | | | 52.5 | 52.5 | 56.3 | 52.5 | 52.5 | 72.5 |
| Evaluation Results | Melting Point of Thermoplastic Resin Composition (° C.) | | 40 / 223 | 40 / 223 | 40 / 223 | 40 / 223 | 40 / 223 | 40 / 223 |
| | Load-Deflection Temperature of Thermoplastic Resin Composition (° C.) | | 95 | 96 | 95 | 100 | 98 | 95 |
| | Bending Elastic Modulus (MPa) | | 3400 | 3500 | 3500 | 6200 | 5000 | 3700 |
| | Hand Touch Feeling | | +++ | +++ | +++ | ++ | +++ | +++ |
| | Abnormal Sound Risk Index before aging | 5N_1 mm/s | 1 | 1 | 1 | 1 | 1 | 1 |
| | | 5N_10 mm/s | 1 | 1 | 2 | 1 | 1 | 1 |
| | | 40N_1 mm/s | 1 | 1 | 1 | 1 | 1 | 1 |
| | | 40N_10 mm/s | 2 | 2 | 2 | 2 | 2 | 2 |
| | | Evaluation | +++ | +++ | +++ | +++ | +++ | +++ |
| | Abnormal Sound Risk Index after aging (80° C. × 300 hr) | 5N_1 mm/s | 1 | 1 | 1 | 1 | 1 | 1 |
| | | 5N_10 mm/s | 1 | 1 | 2 | 1 | 1 | 1 |
| | | 40N_1 mm/s | 1 | 1 | 1 | 1 | 1 | 1 |
| | | 40N_10 mm/s | 2 | 2 | 3 | 2 | 2 | 2 |
| | | Evaluation | +++ | +++ | +++ | +++ | +++ | +++ |

|  |  |  | Example | | | | |
|---|---|---|---|---|---|---|---|
|  |  |  | 7 | 8 | 9 | 10 | 11 |
| Rubber-Reinforced Aromatic Vinyl Resin (A, B) | Component (A) (graft ratio: 70%) | | 7.5 | 15 | 7.5 | 7.5 | 7.5 |
| | Component (A') (graft ratio: 60%) | | | | | | |
| | Component (A") (graft ratio: 68%) | | | | | 6.7 | 13.5 |
| | By-produced Component (B) | | 12.5 | 25 | 12.5 | 15.8 | 19 |
| | Component (B) (SAN-H (trade name)) | | 20 | 20 | 40 | 30 | 20 |
| Component (C) | PBT (Tm = 223° C.) | | 60 | 40 | 40 | 40 | 40 |
| | PA (Tm = 225° C.) | | | | | | |
| | PP (Tm = 165° C.) (control) | | | | | | |
| Component (D) | Glass Fiber | | 10 | 10 | | 10 | 10 |
| | Glass Flake | | | | 10 | | |
| | Glass Bead (control) | | | | | | |
| Antiaging Agent | Sulfur-based | | 0.5 | 0.5 | 0.5 | 0.5 | 0.5 |
| | Phenol-based | | 0.2 | 0.2 | 0.2 | 0.2 | 0.2 |
| Another Resin (E) | Polycarbonate | | | | | | |
| Content of Component (A) (% by weight) | | | 7.5 | 15 | 7.5 | 14.2 | 21 |
| Total Content of Component (B) (% by weight) | | | 12.5 | 45 | 52.5 | 45.8 | 39 |
| Evaluation Results | Melting Point of Thermoplastic Resin Composition (° C.) | | 40 / 223 | 40 / 223 | 40 / 223 | 40 / 223 | 40 / 223 |
| | Load-Deflection Temperature of Thermoplastic Resin Composition (° C.) | | 97 | 93 | 95 | 93 | 90 |
| | Bending Elastic Modulus (MPa) | | 3300 | 3200 | 3100 | 3300 | 3200 |
| | Hand Touch Feeling | | +++ | +++ | +++ | +++ | +++ |
| | Abnormal Sound Risk Index before aging | 5N_1 mm/s | 1 | 1 | 1 | 1 | 1 |
| | | 5N_10 mm/s | 1 | 1 | 1 | 1 | 1 |

TABLE 1-continued

|  |  |  |  |  |  |  |  |
|---|---|---|---|---|---|---|---|
|  |  | 40N_1 mm/s | 1 | 1 | 1 | 1 | 1 |
|  |  | 40N_10 mm/s | 2 | 1 | 2 | 2 | 2 |
|  |  | Evaluation | +++ | +++ | +++ | +++ | +++ |
|  | Abnormal Sound Risk | 5N_1 mm/s | 1 | 1 | 1 | 1 | 1 |
|  | Index after aging | 5N_10 mm/s | 2 | 1 | 1 | 1 | 1 |
|  | (80° C. × 300 hr) | 40N_1 mm/s | 1 | 1 | 1 | 1 | 1 |
|  |  | 40N_10 mm/s | 3 | 1 | 2 | 2 | 2 |
|  |  | Evaluation | +++ | +++ | +++ | +++ | +++ |

TABLE 2

|  |  |  | Example | | Comparative Example | | |
|---|---|---|---|---|---|---|---|
|  |  |  | 12 | 13 | 1 | 2 | 3 |
| Rubber-Reinforced Aromatic Vinyl Resin (A, B) | Component (A) (graft ratio: 70%) |  | 7.5 | 7.5 | 37.4 |  | 7.5 |
|  | Component (A') (graft ratio: 60%) |  |  |  |  |  |  |
|  | Component (A") (graft ratio: 68%) |  | 20.1 |  |  |  |  |
|  | By-produced Component (B) |  | 22.4 | 12.5 | 62.6 |  | 12.5 |
|  | Component (B) (SAN-H (trade name)) |  | 10 | 40 |  |  | 40 |
| Component (C) | PBT (Tm = 223° C.) |  | 40 | 40 |  | 100 |  |
|  | PA (Tm = 225° C.) |  |  |  |  |  |  |
|  | PP (Tm = 165° C.) (control) |  |  |  |  |  | 40 |
| Component (D) | Glass Fiber |  | 10 | 10 | 10 | 10 | 10 |
|  | Glass Flake |  |  |  |  |  |  |
|  | Glass Bead (control) |  |  |  |  |  |  |
| Antiaging Agent | Sulfur-based |  | 0.5 | 0.5 | 0.5 | 0.5 | 0.5 |
|  | Phenol-based |  | 0.2 | 0.2 | 0.2 | 0.2 | 0.2 |
| Another Resin (E) | Polycarbonate |  |  |  |  | 10 |  |
| Content of Component (A) (% by weight) |  |  | 27.6 | 7.5 | 37.4 | 0 | 7.5 |
| Total Content of Component (B) (% by weight) |  |  | 32.4 | 52.5 | 62.6 | 0 | 52.5 |
| Evaluation Results | Melting Point of Thermoplastic Resin Composition (° C.) |  | 40 223 | 40 223 | 40 | 223 | 40 165 |
|  | Load-Deflection Temperature of Thermoplastic Resin Composition (° C.) |  | 88 | 105 | 85 | 80 | 88 |
|  | Bending Elastic Modulus (MPa) |  | 3100 | 3400 | 3100 | 3400 | 1100 |
|  | Hand Touch Feeling |  | +++ | +++ | + | +++ | +++ |
|  | Abnormal Sound Risk Index before aging | 5N_1 mm/s | 1 | 1 | 1 | 1 | 1 |
|  |  | 5N_10 mm/s | 1 | 1 | 2 | 6 | 8 |
|  |  | 40N_1 mm/s | 1 | 1 | 1 | 3 | 3 |
|  |  | 40N_10 mm/s | 1 | 2 | 2 | 9 | 9 |
|  |  | Evaluation | +++ | +++ | +++ | + | + |
|  | Abnormal Sound Risk Index after aging (80° C. × 300 hr) | 5N_1 mm/s | 1 | 1 | 1 | 6 | 1 |
|  |  | 5N_10 mm/s | 1 | 1 | 2 | 9 | 9 |
|  |  | 40N_1 mm/s | 1 | 1 | 1 | 6 | 4 |
|  |  | 40N_10 mm/s | 1 | 2 | 2 | 10 | 10 |
|  |  | Evaluation | +++ | +++ | +++ | + | + |

|  |  |  | Comparative Example | | | |
|---|---|---|---|---|---|---|
|  |  |  | 4 | 5 | 6 | 7 |
| Rubber-Reinforced Aromatic Vinyl Resin (A, B) | Component (A) (graft ratio: 70%) |  |  | 7.5 |  | 7.5 |
|  | Component (A') (graft ratio: 60%) |  | 9.6 |  |  |  |
|  | Component (A") (graft ratio: 68%) |  |  |  | 7.9 |  |
|  | By-produced Component (B) |  | 10.4 | 12.5 | 4.1 | 12.5 |
|  | Component (B) (SAN-H (trade name)) |  | 40 | 40 | 48 | 40 |
| Component (C) | PBT (Tm = 223° C.) |  | 40 | 40 | 40 | 40 |
|  | PA (Tm = 225° C.) |  |  |  |  |  |
|  | PP (Tm = 165° C.) (control) |  |  |  |  |  |
| Component (D) | Glass Fiber |  | 10 |  | 10 |  |
|  | Glass Flake |  |  |  |  |  |
|  | Glass Bead (control) |  |  |  |  | 10 |
| Antiaging Agent | Sulfur-based |  | 0.5 | 0.5 | 0.5 | 0.5 |
|  | Phenol-based |  | 0.2 | 0.2 | 0.2 | 0.2 |
| Another Resin (E) | Polycarbonate |  |  |  |  |  |
| Content of Component (A) (% by weight) |  |  | 9.6 | 7.5 | 7.9 | 7.5 |
| Total Content of Component (B) (% by weight) |  |  | 50.4 | 52.5 | 52.1 | 52.5 |
| Evaluation Results | Melting Point of Thermoplastic Resin Composition (° C.) |  | 223 | 40 223 | 223 | 40 223 |
|  | Load-Deflection Temperature of Thermoplastic Resin Composition (° C.) |  | 92 | 85 | 93 | 85 |
|  | Bending Elastic Modulus (MPa) |  | 3300 | 2000 | 3200 | 2000 |
|  | Hand Touch Feeling |  | +++ | +++ | ++ | +++ |
|  | Abnormal Sound Risk Index before aging | 5N_1 mm/s | 1 | 1 | 1 | 1 |
|  |  | 5N_10 mm/s | 2 | 3 | 8 | 1 |
|  |  | 40N_1 mm/s | 1 | 1 | 3 | 1 |

TABLE 2-continued

|  |  |  |  |  |  |
|---|---|---|---|---|---|
|  | 40N_10 mm/s | 3 | 3 | 9 | 2 |
|  | Evaluation | +++ | +++ | + | +++ |
| Abnormal Sound Risk | 5N_1 mm/s | 9 | 1 | 10 | 1 |
| Index after aging | 5N_10 mm/s | 9 | 4 | 10 | 1 |
| (80° C. × 300 hr) | 40N_1 mm/s | 10 | 2 | 10 | 1 |
|  | 40N_10 mm/s | 10 | 10 | 10 | 2 |
|  | Evaluation | + | + | + | +++ |

The following is clarified from Table 1 and Table 2.

Examples 1 to 13, which contained the components (A), (B), (C) and (D) according to the present invention, maintained a high bending elastic modulus of 3,000 MPa or higher, simultaneously exhibited good hand touch feeling of molded articles, and had a reduced abnormal sound risk index of molded articles. On the other hand, Comparative Example 1, which lacked the component (C) according to the present invention, was poor in hand touch feeling. Comparative Example 2, which lacked the component (A) and the component (B) according to the present invention, was inferior in abnormal sound risk index. Comparative Example 3, in which a substance having a lower melting point than that of the component (C) according to the present invention was used as a crystalline thermoplastic resin, was inferior in bending elastic modulus and also in abnormal sound risk index, though being good in hand touch feeling. Comparative Example 4, in which a substance exhibiting no crystallinity, that is, no melting point was used as a rubber-reinforced aromatic vinyl graft resin, was inferior in abnormal sound risk index after aging. Comparative Example 5, which lacked the component (D) according to the present invention, was inferior in bending elastic modulus and also in abnormal sound risk index, though being good in hand touch feeling. Comparative Example 6, in which a substance exhibiting no crystallinity was used as a rubber-reinforced aromatic vinyl graft resin, was inferior in abnormal sound risk index. Comparative Example 7, which contained spheroidal glass beads alone as fillers, and lacked the component (D) according to the present invention, was inferior in bending elastic modulus, though being good in hand touch feeling.

Further, the thermoplastic resin composition of Example 5 was injection-molded by an electrically operated injection molding machine "Elject NEX30" (model name), manufactured by Nissei Plastic Industrial Co., Ltd., at a cylinder temperature of 240° C., an injection pressure of 100 MPa and a metal mold temperature of 50° C., to obtain a cylindrical test piece having an inner diameter of 20 mm, an outer diameter of 24.8 mm and a height of 15 mm. With supposing the case where door handles and grips were touched and operated by hand, five panelists checked the feeling when touching the surface of the cylindrical part of the obtained test piece by hand; and the five panelists all judged that the surface felt smooth. The five panelists all further judged that the molded article was not deformed when being grasped by hand.

INDUSTRIAL APPLICABILITY

The thermoplastic resin composition according to the present invention can suitably be used as a molding material for molded articles requiring a high rigidity, a good hand touch feeling and a suppression of occurrence of squeaking noise.

The invention claimed is:

1. An article comprising at least a first and second component in contact with each other, wherein the first component is a molded article formed of a first thermoplastic resin composition comprising:
   a rubber-reinforced aromatic vinyl resin (A, B), comprising an ethylene/alpha-olefin rubbery polymer (a1) having a melting point between 0 and 100° C., as measured according to JIS K7121-1987,
   a crystalline thermoplastic resin (C), and
   a fibrous or layered filler (D),
   the first thermoplastic resin composition having melting points, as measured according to JIS K7121-1987, between 0 and 100° C. and between 170 and 280° C., and a bending elastic modulus of 3,000 MPa or higher.

2. The article according to claim 1, wherein the first thermoplastic resin composition comprises component (C) in an amount of 20 to 80% by mass relative to 100% by mass of the total amount of the rubber-reinforced aromatic vinyl resin (A,B) and the component (C).

3. The article according to claim 1, wherein the rubber-reinforced aromatic vinyl resin (A,B) is a resin obtained by polymerizing a vinyl monomer (b1) comprising an aromatic vinyl compound in a presence of an ethylene/alpha-olefin rubbery polymer (a1) having a melting point between 0 and 100° C. as measured according to JIS K7121-1987.

4. The article according to claim 1, wherein the component (C) has a melting point between 170 and 280° C. as measured according to JIS K7121-1987.

5. The article according to claim 4, wherein the component (C) is at least one selected from the group consisting of a polyester resin and a polyamide resin.

6. The article according to claim 1, which is a door knob, a handle, a grip or a portable article.

7. The article according to claim 1, wherein the first and second components are always or intermittently in contact with each other.

8. The article according to claim 7, wherein the first and second components mutually move or collide at contact portions of the two components when an external force is exerted on the article.

9. The article according to claim 1, wherein the second component is a molded article formed of a second thermoplastic resin composition.

10. The article according to claim 9, wherein the second component is a molded article formed of a second thermoplastic resin composition which is the same as the first thermoplastic resin composition.

11. The article according to claim 9, wherein the second component is a molded article formed of a second thermoplastic resin composition which comprises at least one thermoplastic resin selected from the group consisting of polyvinyl chloride, polyethylene, polypropylene, AS resins, ABS resins, AES resins, ASA resins, polymethyl methacrylate resins, polystyrene resins, high-impact polystyrene resins, ethylene-vinyl acetate (EVA) resins, polyamide (PA) resins, polyethylene terephthalate resins, polybutylene terephthalate resins, polycarbonate (PC) resins, polylactic resins, PC/ABS resins, PC/AES resins, PA/ABS resins, and PA/AES resins.

12. An article comprising at least a first and second component which always or intermittently contact each other and mutually move or collide at contact portions of the two components when an external force is exerted on the article,
- wherein the first component is a molded article formed of a first thermoplastic resin composition comprising:
- a rubber-reinforced aromatic vinyl resin (A,B),
- a crystalline thermoplastic resin (C), and
- a fibrous or layered filler (D),
- the first thermoplastic resin composition having melting points, as measured according to JIS K7121-1987, between 0 and 100° C. and between 170 and 280° C., and a bending elastic modulus of 3,000 MPa or higher,
- wherein the component (C) has a melting point between 170 to 280° C. as measured according to JIS K7121-1987, and is comprised in an amount of 20 to 80% by mass relative to 100% by mass of the total amount of the rubber-reinforced aromatic vinyl resin (A,B) and the component (C), and
- wherein the rubber-reinforced aromatic vinyl resin (A, B) comprises an ethylene/alpha-olefin rubbery polymer (a1) having a melting point between 0 and 100° C. as measured according to JIS K7121-1987.

13. The article according to claim 12, wherein the second component is a molded article formed of a second thermoplastic resin composition which is the same as the first thermoplastic resin composition.

14. The article according to claim 12, wherein the second component is a molded article formed of a second thermoplastic resin composition which comprises at least one thermoplastic resin selected from the group consisting of polyvinyl chloride, polyethylene, polypropylene, AS resins, ABS resins, AES resins, ASA resins, polymethyl methacrylate resins, polystyrene resins, high-impact polystyrene resins, ethylene-vinyl acetate (EVA) resins, polyamide (PA) resins, polyethylene terephthalate resins, polybutylene terephthalate resins, polycarbonate (PC) resins, polylactic resins, PC/ABS resins, PC/AES resins, PA/ABS resins, and PA/AES resins.

* * * * *